(12) United States Patent
Howard et al.

(10) Patent No.: US 7,932,715 B2
(45) Date of Patent: Apr. 26, 2011

(54) INDUCTIVE DETECTOR WITH VARIABLE WIDTH LOOPS ON FIRST AND SECOND SURFACES OF SUBSTRATE

(76) Inventors: Mark Anthony Howard, Worlington (GB); Darran Kreit, Foxton (GB)

( * ) Notice: Subject to any disclaimer, the term of this patent is extended or adjusted under 35 U.S.C. 154(b) by 775 days.

(21) Appl. No.: 11/721,905

(22) PCT Filed: Dec. 15, 2005

(86) PCT No.: PCT/GB2005/004854
§ 371 (c)(1),
(2), (4) Date: Jun. 15, 2007

(87) PCT Pub. No.: WO2006/064245
PCT Pub. Date: Jun. 22, 2006

(65) Prior Publication Data
US 2009/0261844 A1    Oct. 22, 2009

(30) Foreign Application Priority Data

| Dec. 15, 2004 | (GB) | 0427417.1 |
| Dec. 20, 2004 | (GB) | 0427760.4 |
| Dec. 23, 2004 | (GB) | 0428124.2 |
| Feb. 16, 2005 | (GB) | 0503178.6 |
| Feb. 22, 2005 | (GB) | 0503595.1 |
| Mar. 30, 2005 | (GB) | 0506375.5 |
| Jul. 7, 2005  | (GB) | 0513936.5 |
| Aug. 8, 2005  | (GB) | 0516215.1 |
| Aug. 22, 2005 | (GB) | 0517134.3 |

(51) Int. Cl.
*G01B 7/14* (2006.01)
(52) U.S. Cl. ............... 324/207.17; 324/207.24
(58) Field of Classification Search .......... 324/207.17
See application file for complete search history.

(56) References Cited

U.S. PATENT DOCUMENTS

| 4,737,698 A | 4/1988 | McMullin et al. |
| 6,011,389 A | 1/2000 | Masreliez et al. |
| 7,196,510 B2 * | 3/2007 | Kawatoko ............... 324/207.17 |
| 2002/0043972 A1 | 4/2002 | Irle et al. |

FOREIGN PATENT DOCUMENTS

GB    2 394 293    4/2004

OTHER PUBLICATIONS

International Search Report for corresponding Application No. GB2005/004854.

* cited by examiner

*Primary Examiner* — Jay M Patidar
(74) *Attorney, Agent, or Firm* — Renner, Otto, Boisselle & Sklar, LLP

(57) ABSTRACT

An inductive detector operable to measure relative displacement along a measurement path of a first body including an electrical intermediate device and a second body including at least three windings. At least one winding is a transmit winding and at least one other is a receive winding. The windings are arranged such that relative displacement of the two bodies causes a change in inductive coupling between at least one transmit winding and at least one receive winding. At least two windings are formed by a convoluted conductor with a first portion extending along the measurement path on a first surface of the substrate and a second portion returning back along the measurement path on an opposite second surface of the substrate. The first and second portions are connected via a connection extending between the first and second surfaces. Each convoluted conductor forms a series of loops defined between the portions on the first and second surfaces, the width of each loop varying along the measurement path and adjacent loops having opposite electromagnetic polarity. At least two windings are spaced in an axis normal to the measurement path.

30 Claims, 28 Drawing Sheets

INDUCTIVE DETECTOR WITH VARIABLE WIDTH LOOPS ON FIRST AND SECOND SURFACES OF SUBSTRATE

This application is a national phase of International Application No. PCT/GB2005/004854 filed Dec. 15, 2005 and published in the English language.

FIELD OF THE INVENTION

This invention relates to inductive detectors and contactless transmission of electrical power and signals.

REVIEW OF THE ART KNOWN TO THE APPLICANT

Various forms of inductive detector have been used to measure the position of two relatively moveable bodies. They are variously referred to as detectors, sensors, transducers, encoders, measurement devices or systems. Some specific forms may be referred to as Inductosyns, resolvers, synchros and linearly variable differential transformers (LVDT's).

Nevertheless, the use of inductive techniques in mass market detectors has been limited. This is mainly due to relatively high manufacturing costs and limited measurement performance.

An inductive detector chiefly comprises two main elements: an electrical intermediate device (EID) and an antenna which are typically arranged to move in a single axis (it is important to note that this invention is not restricted to measurement in a single axis).

The antenna is energized by an electronic circuit which processes the received signals. The electronic circuit outputs electrical data in accordance with the relative position of the EID and antenna. The antenna typically contains transmit windings arranged along the axis of movement. An alternating electromagnetic field is formed around the transmit windings. When the EID enters this electromagnetic field, currents are induced to flow in its circuit. These currents can be sensed directly using a search coil placed within the field—as used by Inductosyn or inductive probe methods. Alternatively a passive, unconnected EID may be used which, in turn, generates its own alternating electromagnetic field. This field induces a signal in the antenna's receive circuits which is indicative of the EID's position relative to the antenna.

Construction of detectors generally using the aforementioned technique was disclosed by McMullen et al. in U.S. Pat. No. 4,737,698. This technique partly took over from the measurement technique described as Inductosyn which was limited by its requirement for electrical connections to the both moving and stationary parts. In the McMullen disclosure, a conductive disk moves relative to a planar array of transmit and receive windings. As the disk moves, it changes the mutual inductance between the windings producing an electrical analogue of the disk's position. The method is limited by weak signal strengths and the need for the conductive disk to remain close to the antenna. This type of system can produce excessive emissions in an effort to generate higher signal amplitudes from higher power transmit signals. Furthermore, such systems suffer from relatively poor electromagnetic susceptibility and low signal:noise ratios.

Higher signal strengths may be achieved by using electrically resonant EIDs. The earliest mention of resonant EIDs, known to the authors, is described in patent JP 52-57727 for a character designating device.

Resonant EIDs co-operating with an antenna are to be found in an automatic meter reading system from Sensus Water Meters Inc., USA, in which each wheel of a meter's odometer rotates relative to a transmit and receive winding. The technique is described in WO 94/25829. According to the phase and frequency of the electronic signature from each of the wheels, the odometer count can be measured remotely by a reader. The method has not been used more extensively because it is only really suitable for odometer style arrangements.

The potential advantages of inductively resonant EIDs co-operating with antennae has previously been recognised by the authors in various earlier disclosures (e.g. GB 0217745.9). To date, these inventions have not generated significant mass market products due to modest performance relative to high production costs. High costs are partly attributable to sophisticated electronics or the use of complex antennae and EID constructions using multi-layer printed circuit boards (PCB's) with relatively large numbers of fine diameter plated via holes. These via holes are expensive to produce; impose space and layout limitations on detector design and interfere with the magnetic field patterns. Measurement performance is limited due to a number of factors including capacitive coupling between transmit and receive circuits; limited measurement resolution; relatively low signal:noise ratios and susceptibility to electromagnetic emissions. Furthermore, applications to date have mostly been limited to measurement of gross displacements typically >1 mm. Consequently, measuring a user's very light touch on a user interface has not been practical.

The application of inductive detectors, and measuring instruments more generally, in extreme or aggressive environments has been restricted by the requirement to supply them with power and receive data from them. In benign environments this is a trivial matter, usually solved by a simple electric cable. In some environments (e.g. potentially explosive areas; nuclear radiation areas or inside pressure vessels) the provision of a cable interconnection is not straightforward and requires significant effort and cost to construct seals and leak-poof connectors. Whilst batteries and wireless communications are possible in some applications, they are not universally applicable.

SUMMARY OF THE INVENTION

This invention provides a high performance but inexpensive inductive detector to measure the displacement of one body relative to a second; identification of target objects and transmission of electrical power and signals—all in a non-contact manner.

In one embodiment, the invention comprises an EID co-operating with an antenna which further comprises transmit and receive windings energised by an electronics circuit further comprising a microprocessor to control the antennae and operable to output electrical signals according to the identity and position of the EID relative to the antenna. In a further embodiment, the antenna receives power and outputs signals via a transformer.

DETAILED DESCRIPTION OF THE DRAWINGS

First Embodiment

In a first embodiment, the invention provides an inexpensive but high performance inductive detector.

Figure 1:
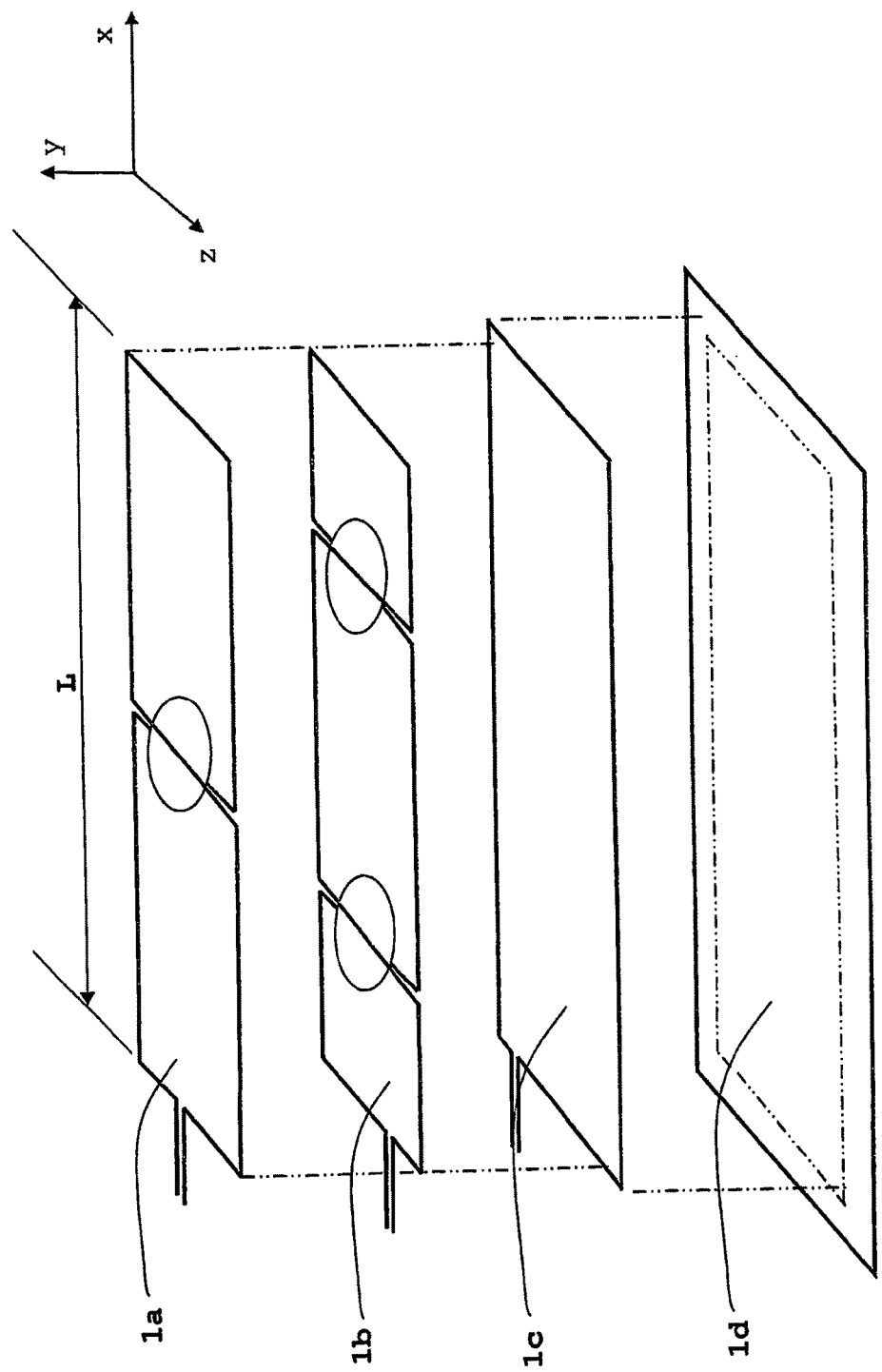
FIG. 1 shows an exploded view of a known form of planar inductive antenna.

FIG. 1 shows an exploded view of a known form of planar inductive antennae. Such forms typically contain two receive windings [1a and 1b] inside a transmit winding [1c]. The receive windings [1a & 1b] are spaced apart along the measurement path [x-axis] by a distance of L/4 where L is their winding pitch. An alternating electromagnetic field is formed around the transmit winding [1c] when it is energized. The transmit winding [1c] and receive windings [1a & 1b] are balanced with respect to each other so no net signal appears at the receive windings [1a & 1b] without an EID [6].

Figure 2:
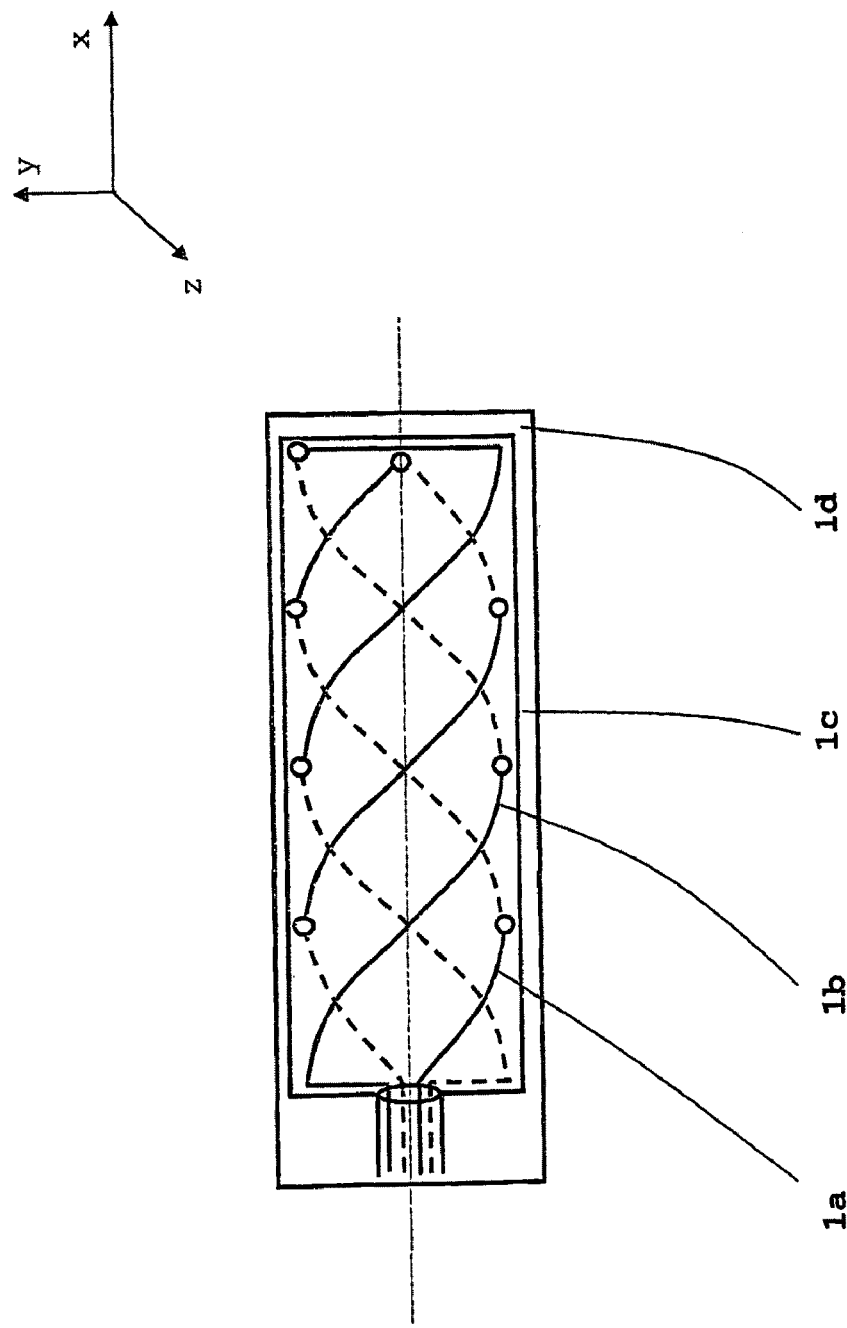
FIG. 2 shows a simplified schematic of a known form of inductive antenna constructed using a 2 layer printed circuit board (PCB).

FIG. 2 shows a simple, practical construction of the antenna schematic shown in FIG. 1 in which the various windings [1a, 1b & 1e] are formed as tracks on the surfaces of a 2 layer PCB [1d]. The layers of the PCB [1d] are connected using first and second groups of plated via holes as shown. There are a number of significant problems with this construction. Firstly, the via holes are expensive to produce due to the need for accurate drill positioning and through plating. Second, the production yield of PCB's with lots of via holes is reduced because of the imperfect nature of the via hole drilling and plating process. Third, the use of plated vias limits the choice of the PCB substrates to the more costly forms such as FR4 grade rather than the lower cost forms such as CEM1 (which cannot easily be produced with plated vias). Fourth, the vias distort the alternating magnetic field in proportion to their size. Fifth, via holes are problematic in applications which have extreme temperature cycles since they are prone to thermal cracking or fatigue. Sixth, the smaller the via hole, the greater the production cost and small via holes are preferable in an inductive detector design because they produce minimum magnetic distortion. Seventh, it is not practical to drill small diameter via holes in thick PCB substrates (which may be desirable for mechanical purposes) because long and thin drill bits are prone to snapping. Eighth, overlapping transmit and receive windings on the various surfaces of the PCB [1d] produces capacitive coupling between the otherwise electrically insulated windings (this reduces the detector's signal:noise ratio). Ninth, via holes are a dirt trap which means that wipe clean or readily disinfected antennae [1] surfaces are not practical. Tenth, detectors of this type often require multiple turns in each winding loop as well as multiple pitches. In such multi-turn constructions >100 vias per antenna [1] may be required. Such a high number of vias places a significant constraint on detector design especially in small detectors.

Figure 3:
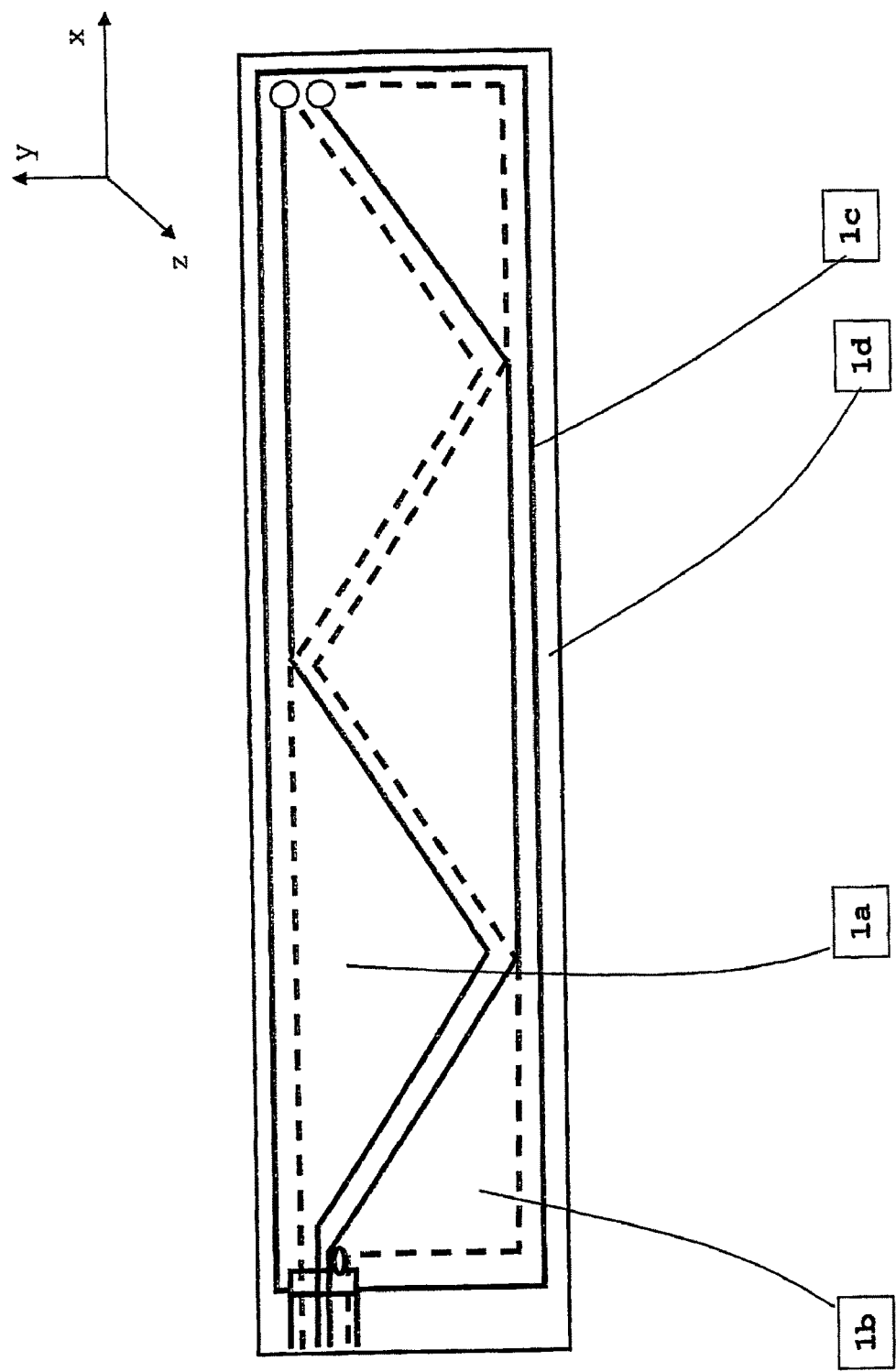
FIG. 3 shows a schematic of the invention's antenna.

FIG. 3 shows a first embodiment of the invention which provides an inexpensive, high performance inductive antenna. As shown in FIG. 3, a transmit winding [1c] surrounds two receive windings [1a & 1b]. The windings are formed as conductive tracks on a two sided PCB [1d]. The receive windings [1a & 1b] are spaced apart along the measurement path (i.e. the x-axis) and at right angles to the measurement path (i.e. the y-axis). In the x-axis the receive windings [1a & 1b] are spaced apart by a distance of L/4 where L is their winding pitch. In the y-axis, the receive windings [1a & 1b] are spaced so that they are interdigitated but do not overlap. The transmit winding [1c] is energised with an AC signal from the remote electronics circuit [not shown for clarity] and a field is formed around it. It is important to note that the transmit [1c] and receive windings [1a & 1b] are substantially balanced with respect to each other so that no net signal appears at the receive windings [1a & 1b] in the absence of the EID. The receive windings [1a & 1b] may be considered as a sine and cosine winding due to their L/4 displacement—thus affording the potential for position calculation using a simple arctan computation. As can be seen, each of the receive windings [1a & 1b] is formed by a first convoluted conductor extending along the measurement path on the PCB's [1d] upper face returning back along the measurement path on the PCB's [1d] lower face. The convoluted conductor forms a series of loops in each receive winding [1a & 1b] so that adjacent loops in each series have opposite electromagnetic polarity. The width of each loop varies along the measurement axis. The receive windings [1a & 1b] are connected between layers using one via hole per receive winding [1a & 1b]. Only one via hole is required per receive winding [1a & 1b] and this is situated at the end of the linear antenna [1]. Advantageously, the extreme ends of a linear encoder are typically not used due to non-linear end effects. The via may be relatively large or simply an unplated hole with a soldered pin from one side of the PCB to the other. Since there is no overlap of the windings there is minimal capacitive coupling.

Deviations from a linear function of mutual inductance with respect to x-axis displacement can be simply corrected for in software since they depend only on the known shape of the windings.

The construction shown in FIG. 3 improves detector performance and reduces the manufacturing cost due to a number of advantages: the non-overlapping layout of the windings; increased selection of inexpensive PCB laminate materials; reduced number of vias; advantageous via hole positioning.

Figure 4:
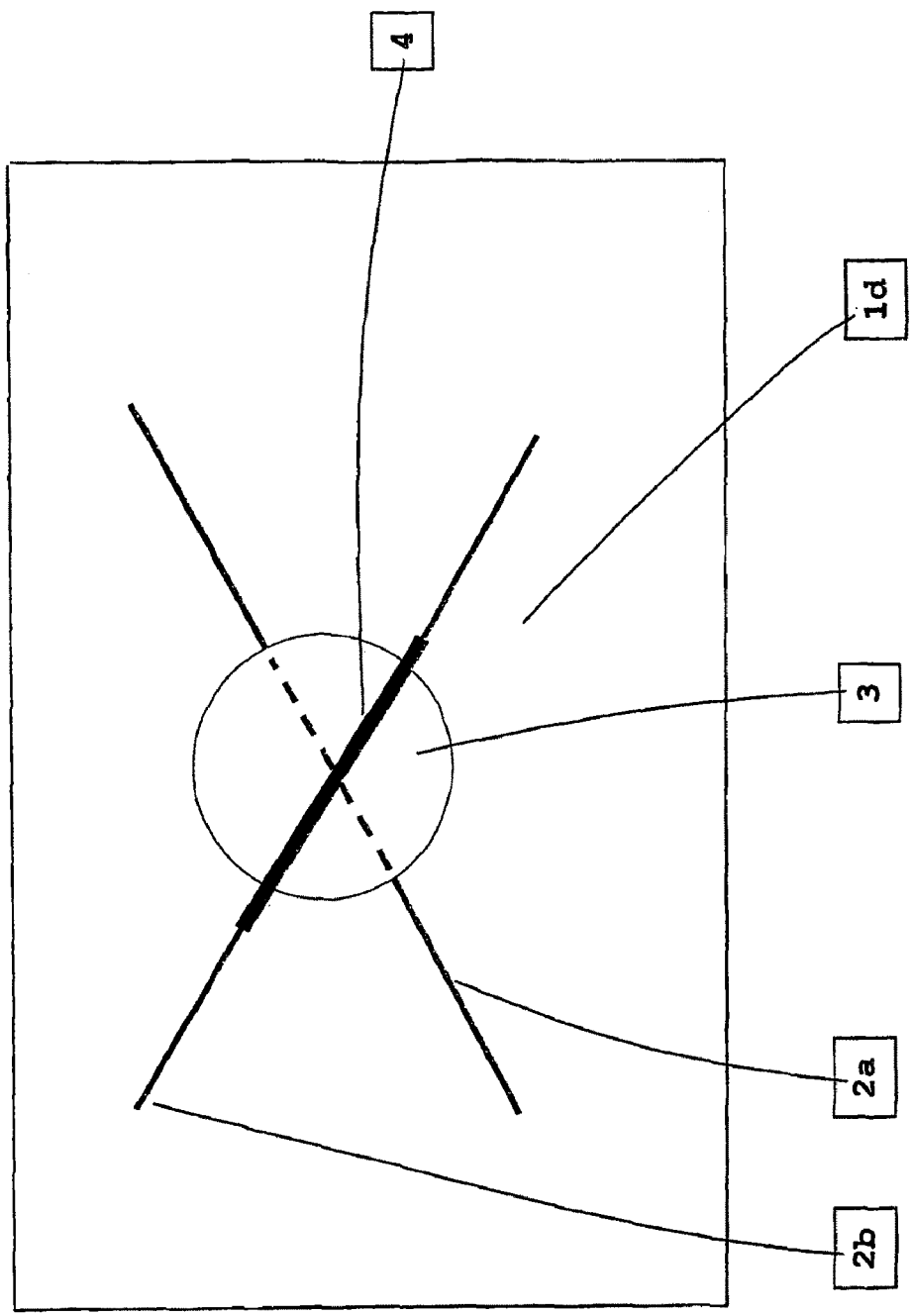
FIG. 4 shows a method of constructing conductor crossovers on the antenna.

FIG. 4 shows a cross over (rather than a via) on a single layer PCB. A first winding portion [2a] is continuous and deposited on an insulating substrate [1d]. A second circuit portion [2b] is split so as to maintain electrical isolation from the first part. A layer of insulating coating [3] is deposited over the immediate area. A link is formed between the two parts of the split conductor [2b] by a conductive strip [4]. Alternatively, the link may be formed by a number of other means including a link of copper wire soldered in place onto pads or a zero ohm resistor. This technique enables the use of a broad range of substrate materials which would not normally be considered suitable for planar inductive antennae such as glass, ceramic, moulded or cast plastic.

Figure 5:
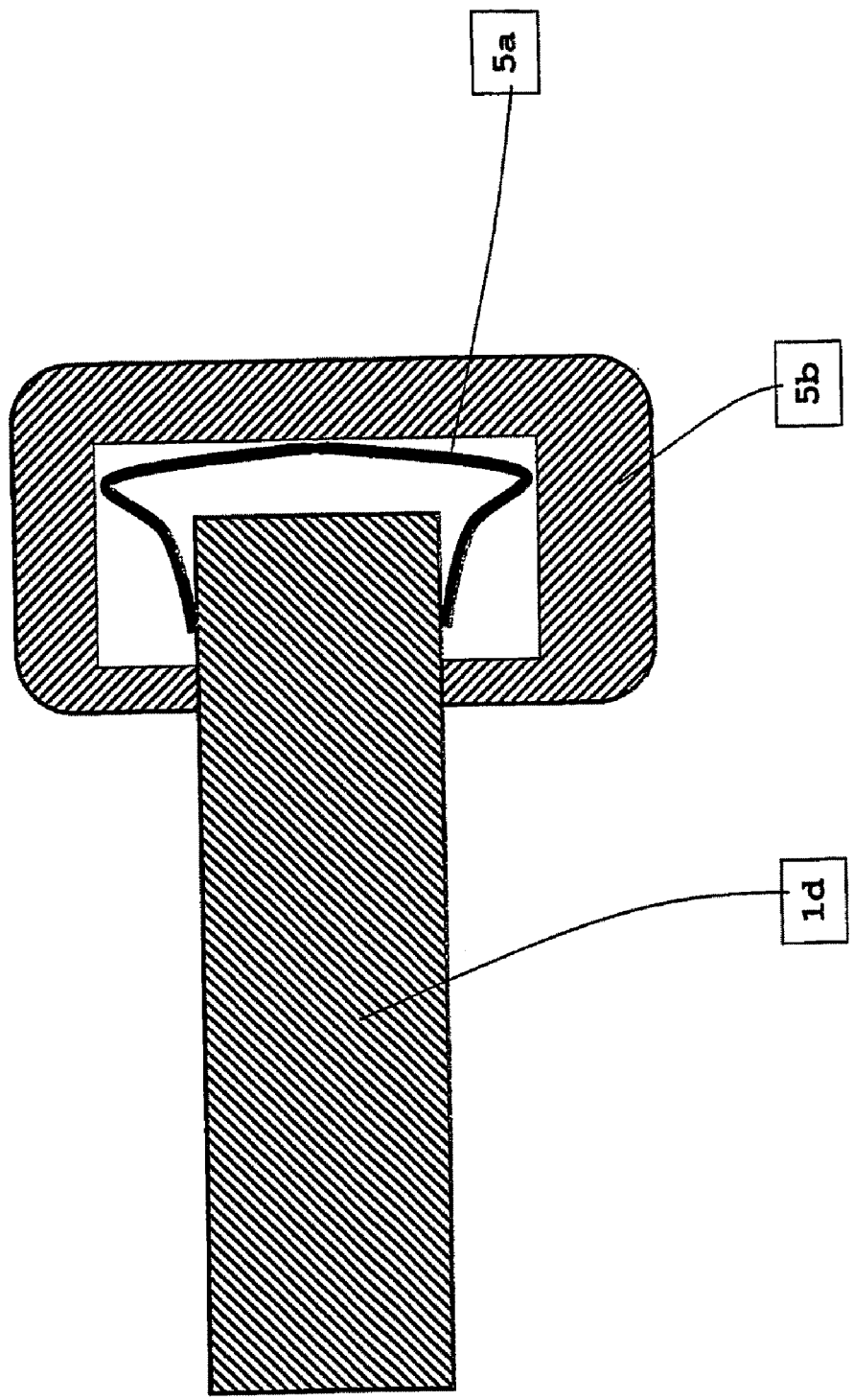
FIG. 5 shows a schematic of an edge connector for use on an antenna

FIG. 5 shows a further technique to eradicate plated via holes. A link at the edge of the antenna [1] is formed between the two faces of PCB [1d] by an edge connector. The edge connector comprises a plastic moulded housing [5b] containing a sprung copper lead [5a].

Figure 6:
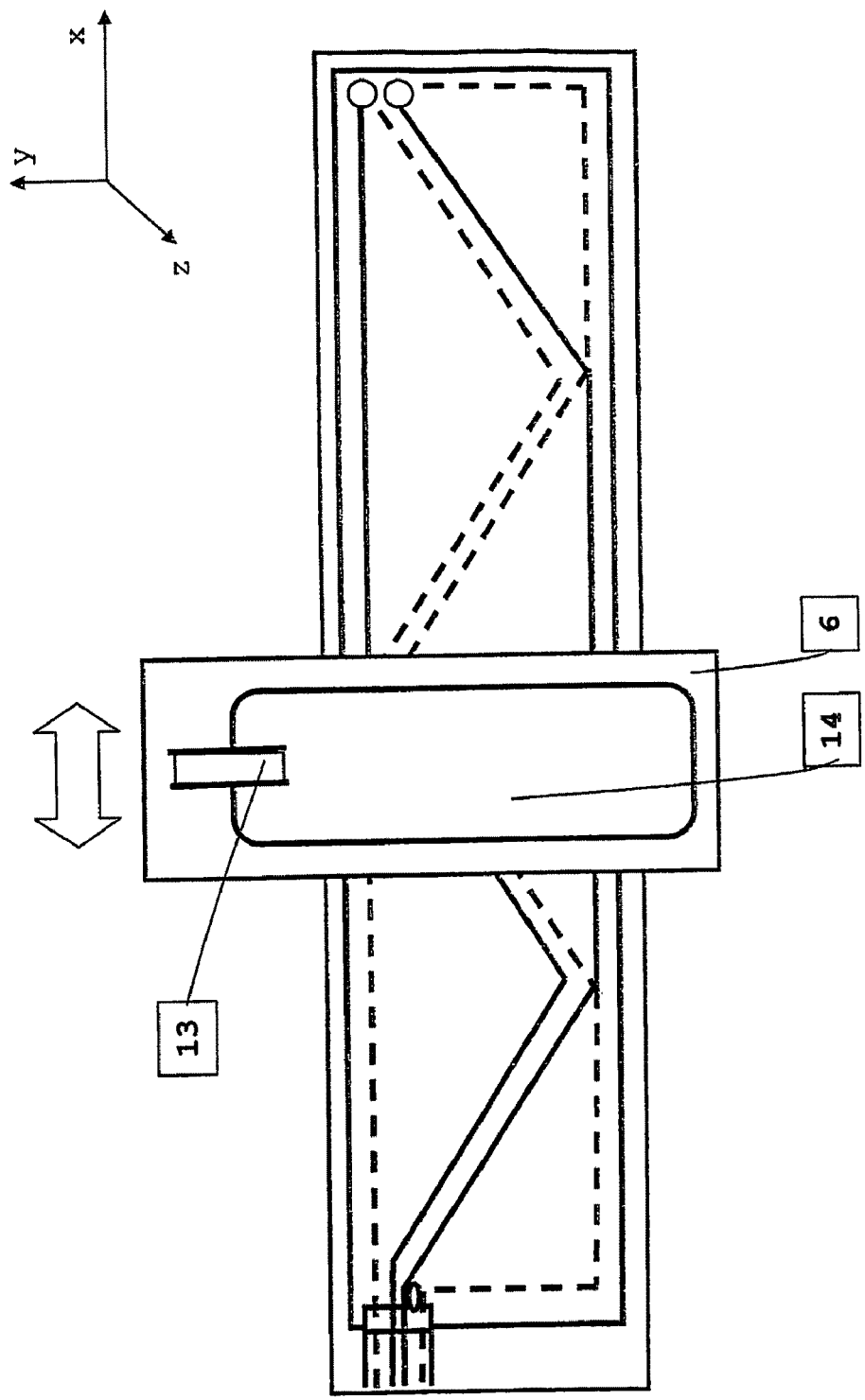
FIG. 6 shows a schematic of an antenna co-operating with an EID.

Compared to traditional constructions, in which receive windings [1a & 1b] overlap each other, this construction has greater sensitivity to offsets of the EID in the y-direction. This undesirable sensitivity can be minimised very simply by extending the area of the EID [6] in the y-axis so that it overlaps the effective edges of the antenna. FIG. 6 schematically shows the antenna layout co-operating with a resonant EID [6] comprising an inductor [14] and capacitor [13] in electrical series.

FIGS. 3 and 6 show the receive windings [1a & 1b] in the shape of simple triangles. As will be appreciated by those skilled in the art, this is not necessary for successful operation. Instead, the windings may be formed from conductors arranged as a sinusoid, a curve or a series of straight lines. If triangles are used, the output will not be linear and the electrical output will contain higher order effects. The biggest non-linearity will be a fourth harmonic effect which may be in excess of 2% of full-scale. This can be remedied by arranging a notch at the centre of each peak of sufficient width to bring the linearity down to <0.5%. In the main, non-linearity will be due to higher harmonics. Their high order means that the fundamental sensitivity curve is not as uniform as it might be. This undesirable effect may be simply reduced by using a larger gap between the antenna [1] and EID windings or by using curved winding shapes. As with traditional constructions there are the usual issues of non-linearity at the ends (smooth cubic-like curve) and both receive windings [1a & 1b] need to be balanced to the transmit windings [1c]. Both issues may be solved by extra loops at the ends of the receive windings [1a & 1b].

As with known antennae constructions, EMC emissions and immunity levels may be improved by the provision of additional balancing loops away from the measurement area.

Various methods of EID or antennae [1] construction are feasible. These include—but are not limited to—double sided printed circuit board with plated through holes; ultrasonic bonding of insulated copper wire on to an insulated substrate; printed conductive ink on an insulating substrate; sewing of copper wire on to an insulated substrate; the deposition of conductive tracks on to a silicon substrate; windings laser cut or stamped and then folded from sheet metal such as copper, aluminium or steel.

The invention is not restricted to using passive EIDs. In an alternative 'active' arrangement the transmit [1] and receive windings [1a & 1b] are arranged for relative movement and no EID [6] is used. In such an arrangement the transmit winding [1c] is formed by a coil which moves in a path above the receive windings [1a & 1b]. This kind of arrangement is most advantageous where there is limited space; where signal strengths need to be maximised and where the provision of connecting wires to the moving part provides no particular problem, e.g. a curvi-linear encoder with limited travel pivoting from a central axis.

Second Embodiment

PCB's are a useful material or technique to produce antennae [1] and EIDs in this invention. Nevertheless, as described previously, the use of double sided PCB's for these components has some significant limitations due to the necessary use of plated through holes or cross overs. This second embodiment of the invention enables an antenna design with relatively few via holes or cross overs—all of which may be produced in a single straight line.

Figure 19:
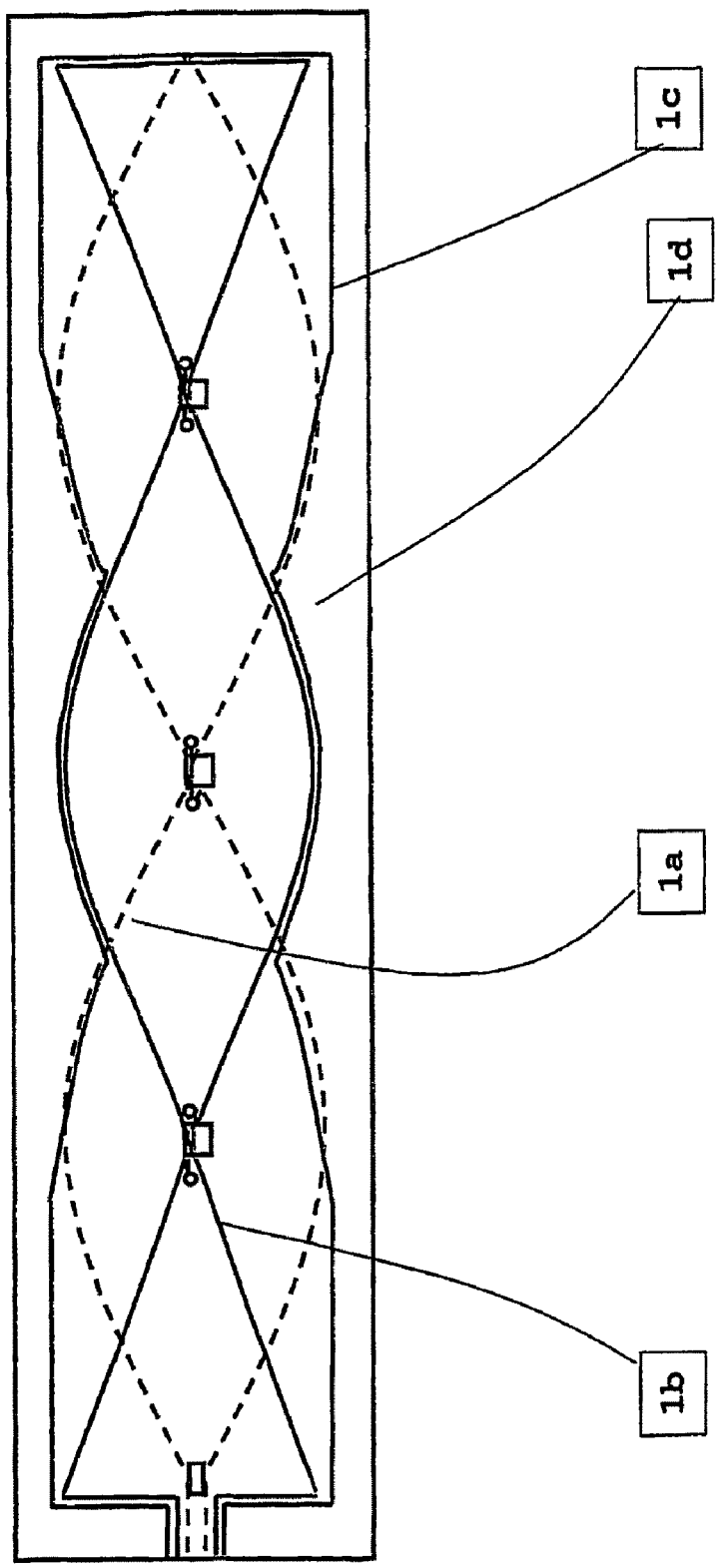
FIG. 19 shows an antenna construction using only a few via holes and windings each of which is substantially on a single layer of PCB.

FIG. 19 shows a simplified schematic of the embodiment for a linear detector. As in the previous embodiment, the antenna [1] comprises a transmit winding [1c] surrounding two receive windings [1a & 1b] which are spaced apart along the measurement path (i.e. x-axis) by ¼ of their winding pitch. A double sided PCB [1d] comprises a receive winding [1b] substantially on its upper surface (nearest the EID [6]) which is surrounded by a transmit winding [1c] also on the upper surface. Another receive winding [1a] of slightly larger area than the first receive winding [1b] is located substantially on the lower surface. In this embodiment the receive windings are again spaced apart both along the measurement axis [x-axis] and in an axis at right angles—in this embodiment the z-axis.

To achieve the best linearity it may be necessary to vary the area of the receive windings, for example, by adding to the fundamental sine function with a third or higher harmonic. This can also be used to extend the linear range and flatten out end errors without the need for extending the antenna [1] length (e.g. by adding additional loops at the ends of the receive winding).

In the arrangement shown in FIG. 19, the width of the transmit winding [1e] may be varied as an alternative method of providing electrical balance—particularly for the traditionally problematic cosine receive winding [1a]. Further, this does not require overall length to be increased. Since the receive windings [1a & 1b] are essentially on separate layers, gain errors can be removed simply by increasing the width of the winding furthest away from the EID [6].

This particular antenna [1] arrangement is easy and inexpensive to produce; requires only a small amount of PCB material; has few vias or crossings which can be arranged in a straight line and provides an antenna with excellent performance.

Third Embodiment

In a third embodiment, the invention provides a contactless method of transmitting power to and receiving signals from an inductive detector's antenna via a transformer.

In a first example of this embodiment, a system with low capacitive coupling is provided. In a second example of this embodiment, a system with no direct electrical connections suitable for an antenna on a rotating shaft, for example, is provided. In a third example of this embodiment, power can be supplied and signals received through an impermeable membrane, e.g. a pressure vessel wall.

In the first example of this embodiment, a high performance construction of an inductive detector with reduced capacitive coupling is provided. This is particularly advantageous in applications using complex winding patterns or where the presence of fluids, dirt or dust in the sensing area causes varying levels of capacitive coupling which can produce erroneous measurement. This removes, in the first instance, the need for high common mode rejection ratio (CMRR) electronics. Further advantages of galvanic isolation are also provided which is useful in various applications, e.g. where the sensor is in a hazardous atmosphere or perhaps connected to a person undergoing medical treatment.

Figure 7:
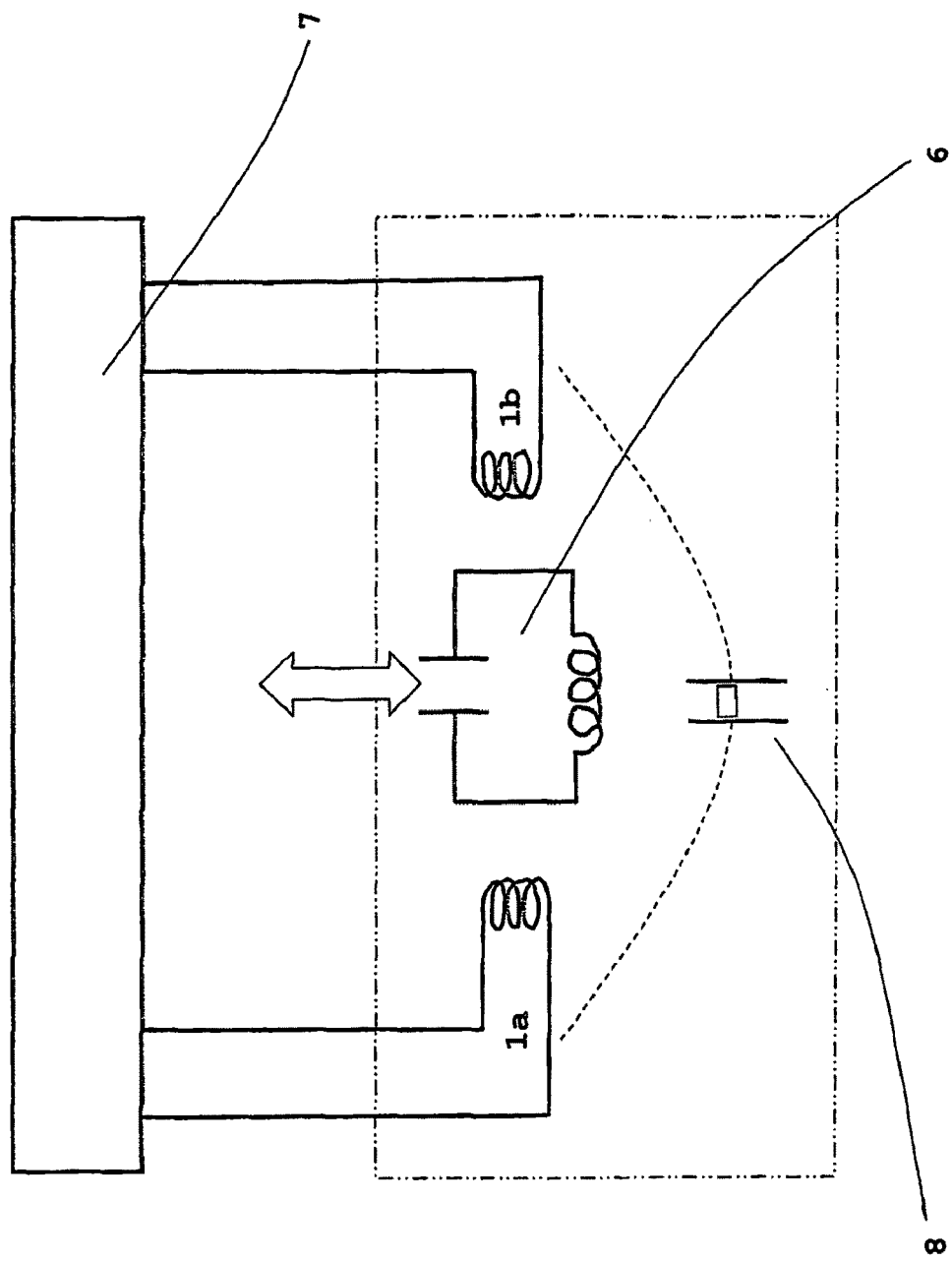
FIG. 7 shows a schematic of a known form of position encoder.

FIG. 7 shows a simplified electrical schematic of a known form of detector. Only one transmit and one receive winding are shown for clarity. The position of the EID [6] is measured relative to an arrangement of transmit and receive windings by an electronic circuit [7]. The parasitic effect [8] is shown schematically.

Figure 8:
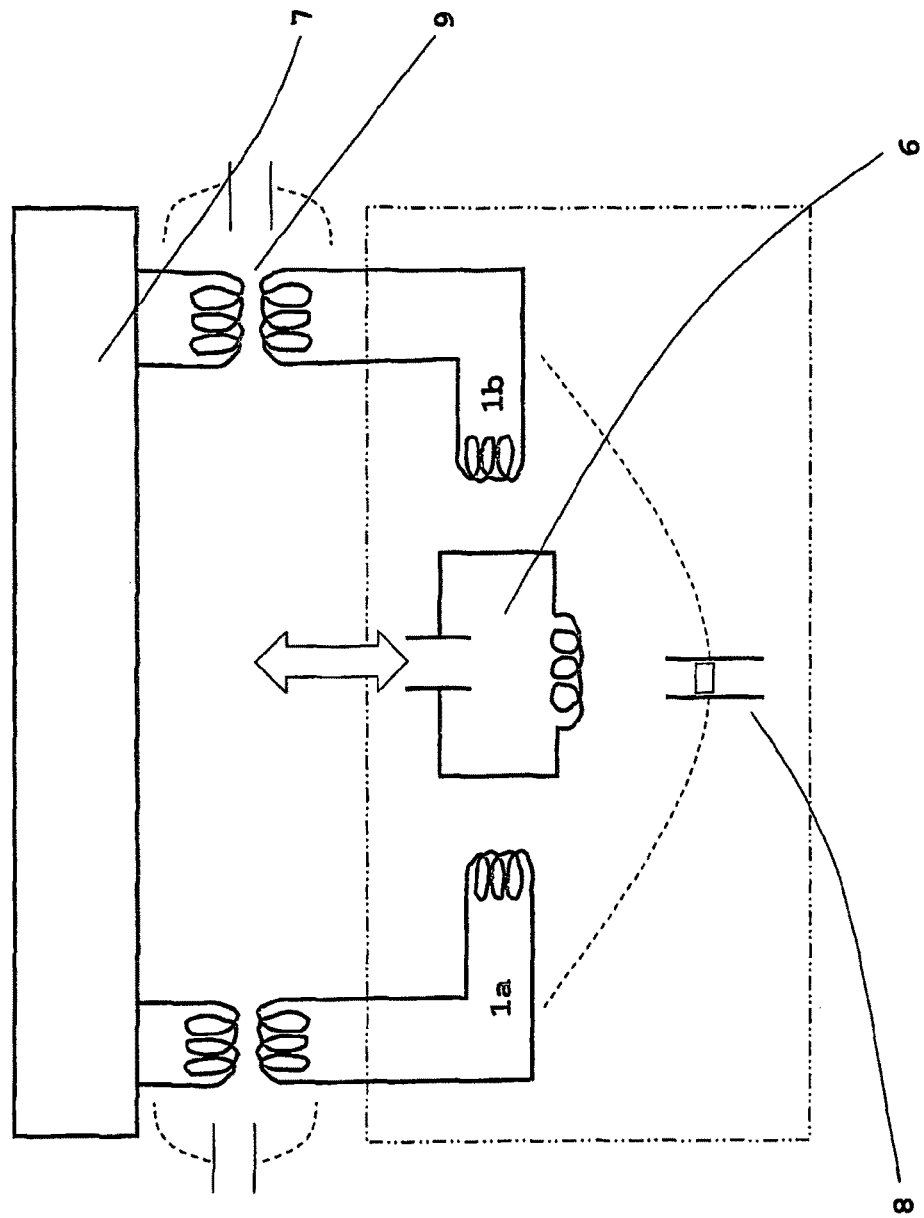
FIG. 8 shows a position encoder with reduced capacitive coupling and improved electrical isolation.

FIG. 8 shows a simplified schematic of the invention where the physical connection between the electronics circuit [7] and the antenna area is broken by a transformer [9]. The transformer [9] provides a physical separation but continues to provide an AC or inductive connection from the electrical coupling between its primary and secondary windings.

Figure 9:
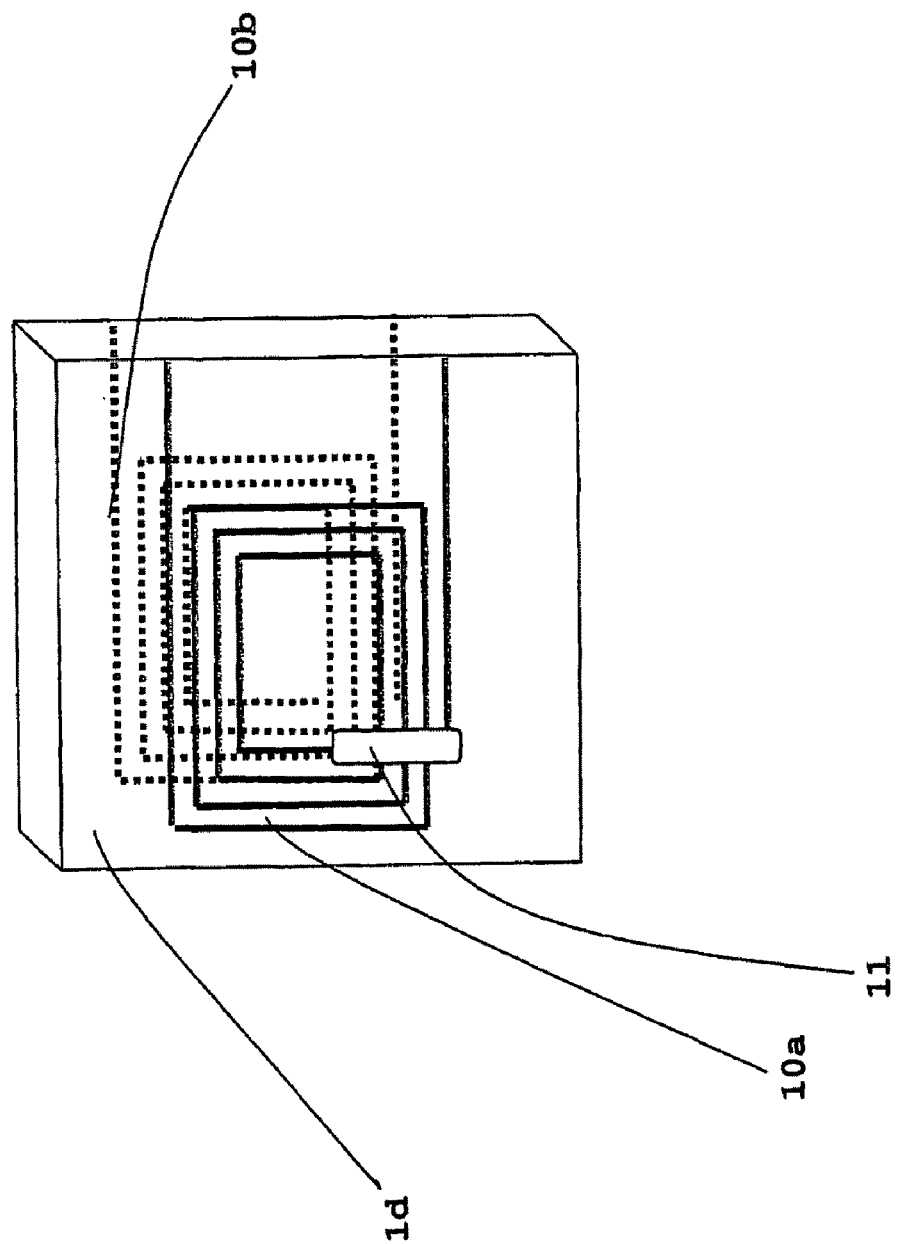
FIG. 9 shows a schematic of simple form of PCB transformer.

FIG. 9 shows a simple form of PCB based transformer [9] whereby a primary winding [10a] on a first side of a PCB co-operates with a secondary winding [10b] on the second side of the PCB. A simple construction for each of the windings is provided by a wire link [11] from the inside to the outside of the spiral loop.

Figure 10:
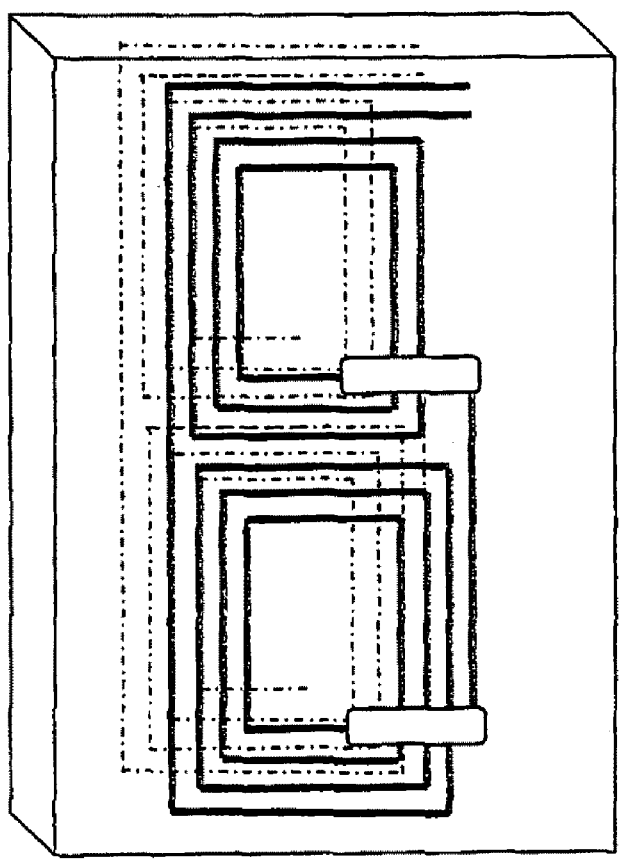
FIG. 10 shows a schematic of a second form of PCB transformer.
Figure 11:
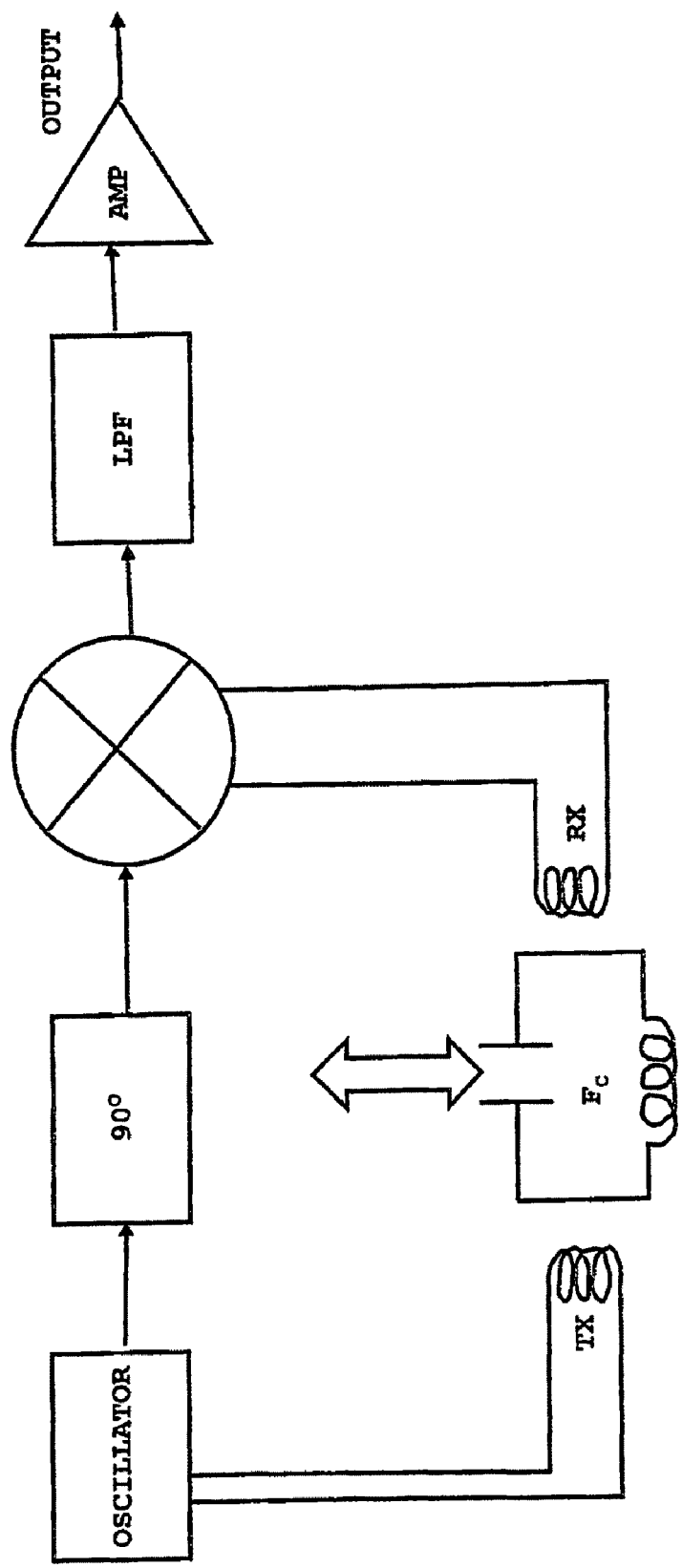
FIG. 11 shows a schematic of a known form of position encoder with a sophisticated electronics circuit.

FIG. 10 shows a more sophisticated form of PCB based transformer [9] similar to that shown in FIG. 9 but balanced with a counter winding so as to remove the potential of electromagnetic emissions to the far field.

Figure 20:
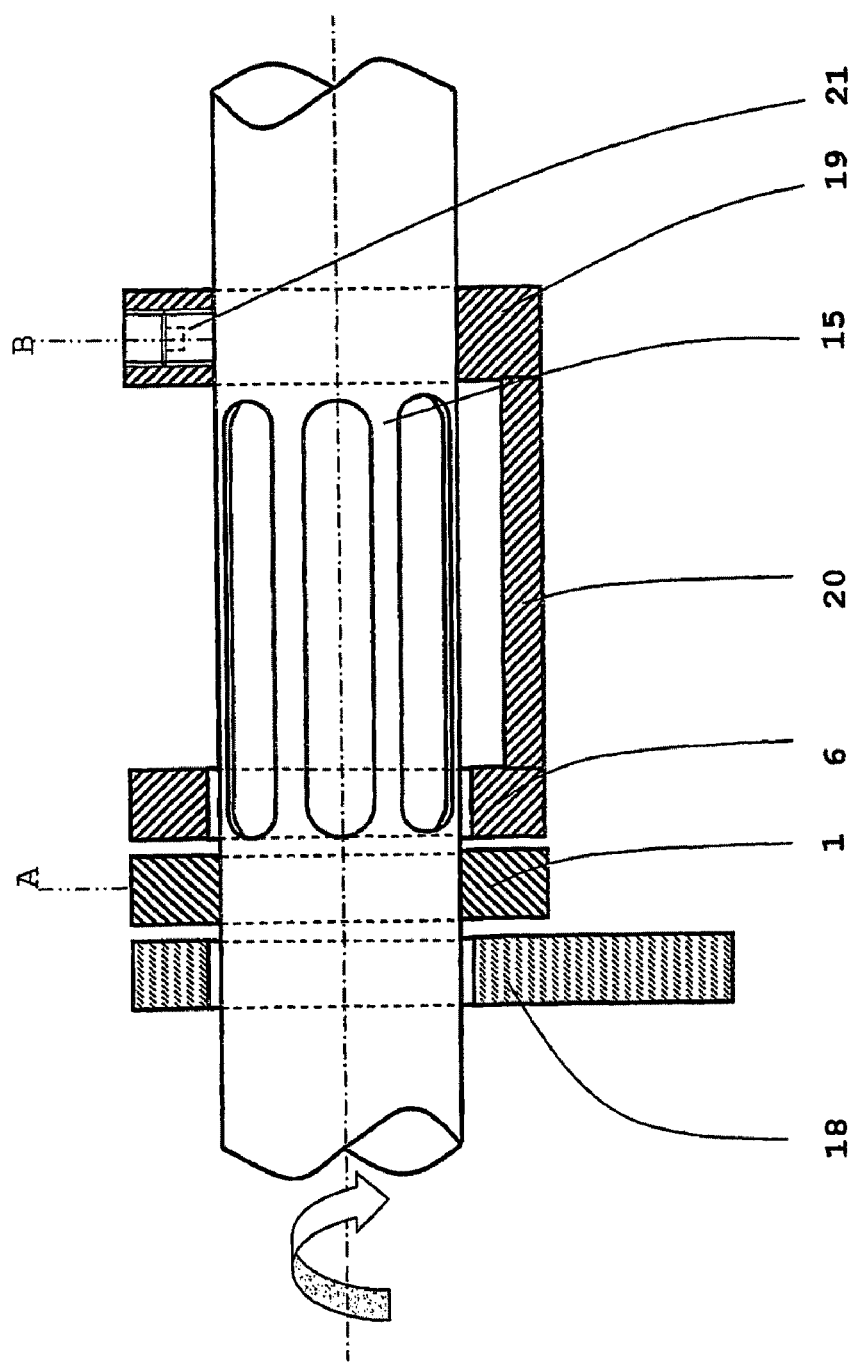
FIG. 20 shows an arrangement for the measurement of torque in a rotating shaft.

FIG. 20 shows a sectional schematic of a second example of this embodiment. The inductive detector co-operates with a rotating shaft [15] to measure the degree of twist in the shaft (and hence applied torque). An EID [6] is attached to point B on the shaft using a bar [20], collet [19] and a grub screw [21]. An antenna [1] comprising a planar arrangement of transmit [1c] and receive windings [1a & 1b] and is attached to the shaft [15] at point A. As a torque is applied to the shaft [15] the angular position of the shaft's [15] circumference at point A shifts slightly relative to the angular position of the shaft's [15] circumference at point B. The magnitude and sense of the angular variation is directly proportional to magnitude and sense of the applied torque up to the shaft's [15] elastic limit. The magnitude of the angular variation may be increased by providing slots or grooves in the shaft [15] as shown, in order to provide a sufficiently large angular variation that might be measured accurately. If the torque variation produces a maximum angular variation of +/− X degrees then preferably the antenna [1] and EID [6] are arranged in a multi-pitch construction of 360/2X pitches. Preferably the antenna [1] and EID [6] are constructed according to a multi-pitch winding arrangement as described later in this document. The transmit windings [1c] are energised from an electrical supply via an axially perforated, annular transformer [18]. The signals from the antenna's [1] receive windings [1a & 1b] are transported using multiple windings of the same transformer [18] to an electronics circuit [not shown for clarity]. Preferably the axial distance between the transformer [18] and the antenna [1], as well as the distance between the EID [6] and the antenna [1] should be kept as small as possible to produce good electrical coupling. The electronics circuit supplies energy to the antenna [1] and receives signals from the EID [6] via the transformer [18]. The electronics circuit is energised by an electrical power supply and outputs electrical data in accordance with the relative position of the EID [6] and antenna [1]. Preferably the EID [6], antenna [1], transformer [18] and electronics circuit are constructed from multi-layer printed circuit board. This arrangement removes the need for slip rings to the antenna [1].

In a further variant, it is possible to separate the transmit winding [1c] and receive windings [1a & 1b] on to multiple PCB's [1d] and to position the EID [6] between the two.

The electronics circuit is preferably configured so that a single electronics circuit can operate a number of detectors or other inductive displacement detectors as described in this or the author's co-pending applications. The operation of multiple detectors is enabled by either the use of a multiplexer or the use of EIDs [6] of different frequency. This is particularly useful in automotive steering applications where it is desirable to measure both steering torque and angle.

Figure 21:
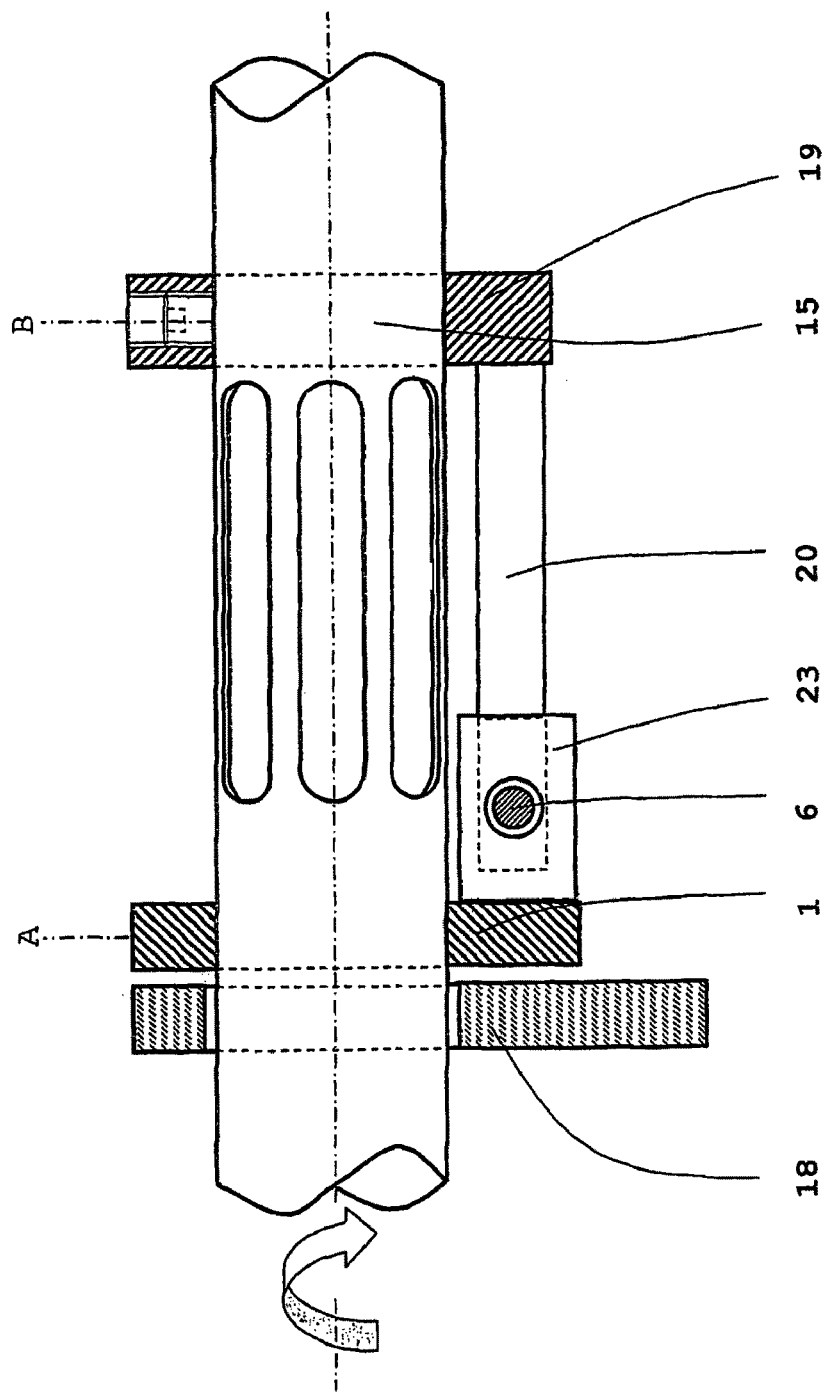
FIG. 21 shows in section an arrangement for the measurement of torque in a rotating shaft using a non resonant EID.
Figure 22:
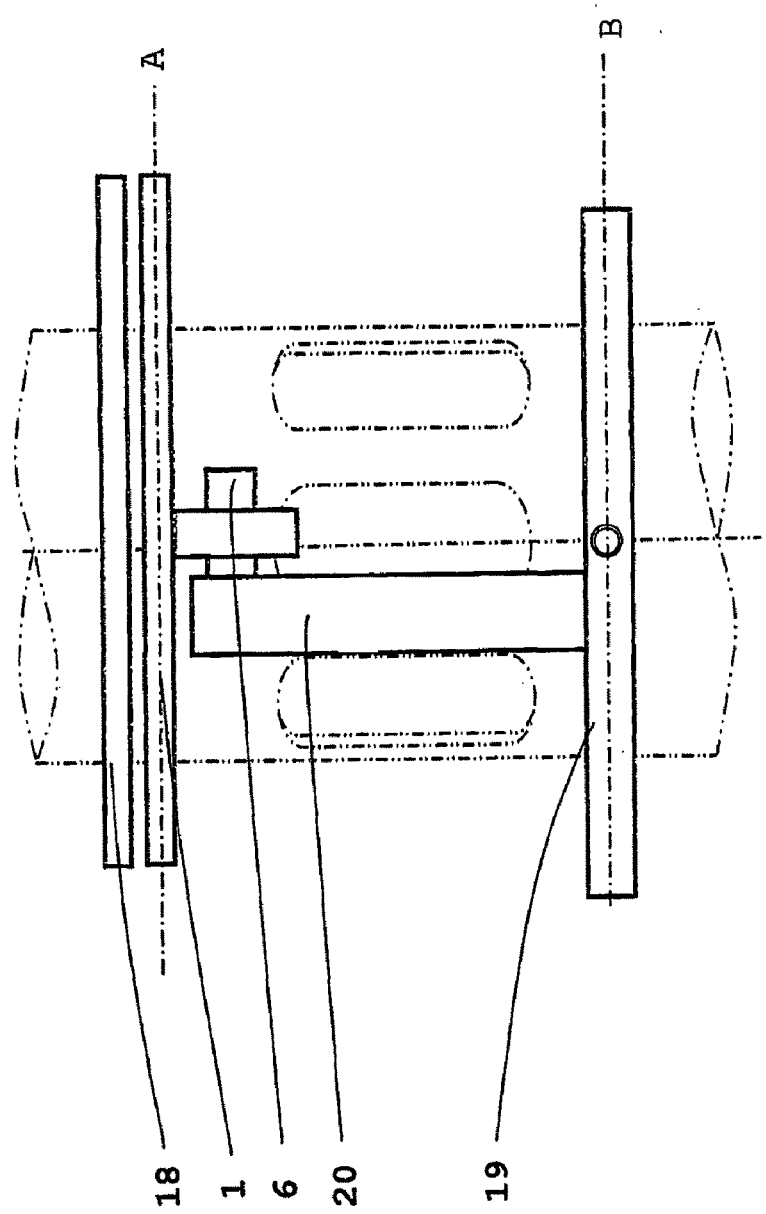
FIG. 22 shows in plan view an arrangement for the measurement of torque in a rotating shaft using a non resonant EID.

FIG. 21 shows a sectional schematic of an alternative arrangement to measure torque. In this arrangement, the EID [6] moves normally to an antenna assembly [1 & 23]. The antenna assembly [1 & 23] has a hole in which the EID [6] is positioned substantially centrally. Preferably the EID [6] in this arrangement is a magnetically permeable element such as a ferrite cylinder. The antenna assembly [1 & 23] comprises a planar arrangement of at least one winding arranged around the hole such that the variation in the relative displacement of the EID [6] relative to the antenna assembly [1 & 23] may be detected. FIG. 22 shows a plan view of this form of the detector with the shaft [15] shown in a hashed line outline for clarity.

A PCB carrying a resonant EID [6] can be arranged such that 2 resonant circuits are embodied of different frequencies on the same board. Similarly, the antenna [1] can be arranged so that two sets of transmit and receive windings [1a, 1b & 1c] are present. Communication via the transformer [18] coupling can be made to each of the antenna [1] windings at the differing frequencies. This enables electrical redundancy to be cost effectively engineered without full replication of the EID [6] and antenna [1]. This is particularly useful in safety related applications such as steering column torque detectors.

This inductive detector and transformer [18] arrangement is well suited to operation in hostile environments where traditional detectors might suffer problems due to dirt, chemical attack, fluid ingress etc. Hostile conditions are common in chemical, process, oil and gas plants where such conditions are contained inside reactor and pressure vessels. If we consider, for example, a steel vessel containing pressurised chlorine gas then reliable containment is clearly important. In order to monitor conditions in the vessel instrumentation is necessary. This instrumentation will require a power supply and a signal output. Under more normal circumstances this would be a trivial matter of routing wires to and from the measuring instruments. In a pressure vessel, however, it is not desirable to puncture the vessel's wall since this is a source of pressure or fluid leakage.

This invention enables the contactless transmission of power and data to and from instrumentation (which does not necessarily include inductive detectors) through a membrane such as a steel, plastic or glass membrane without the need to form seals around cables or connectors.

Figure 28:
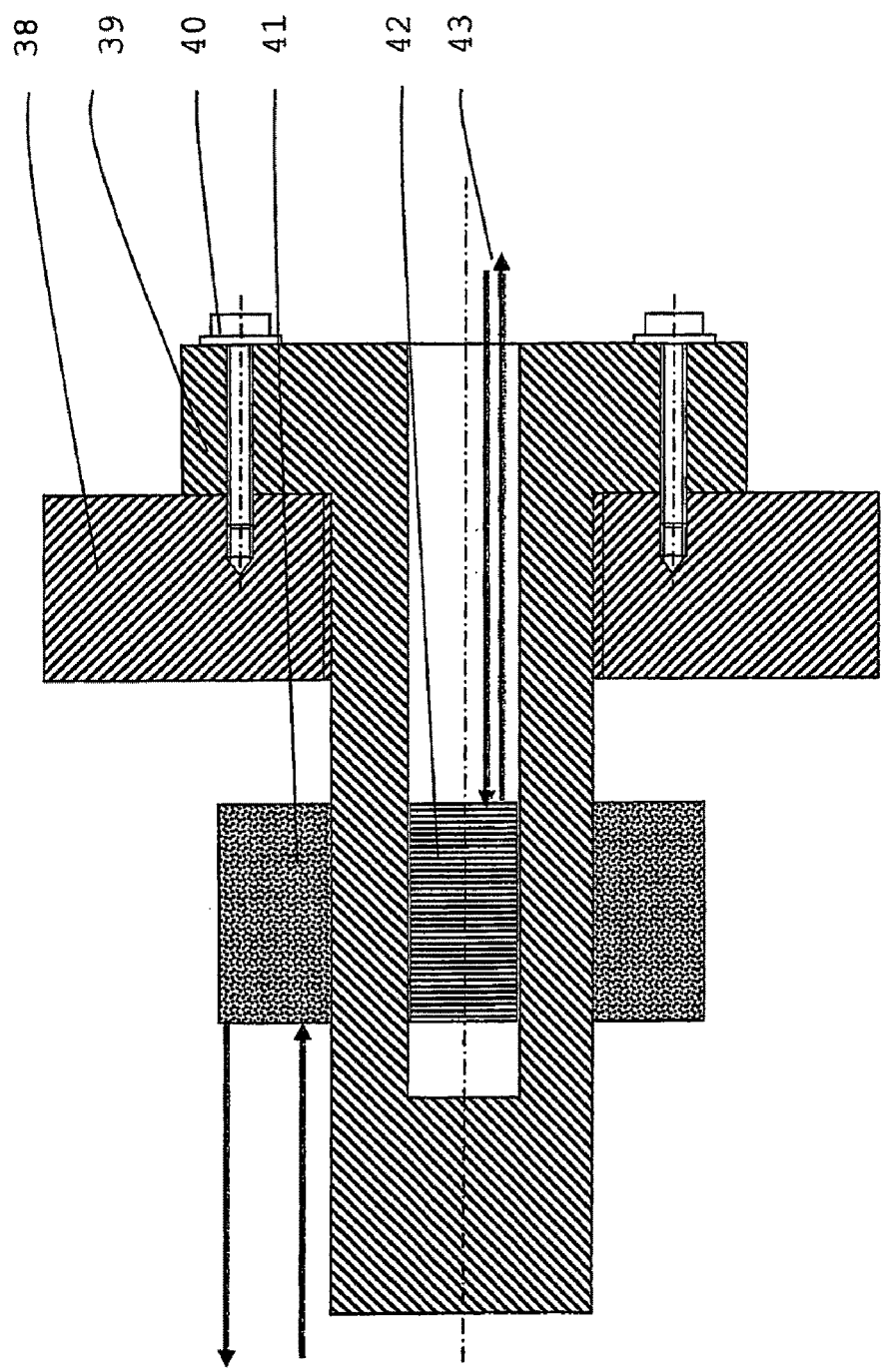
FIG. 28 shows an arrangement of a transformer for the contactless transmission of power and data for instrumentation which does not necessarily include an inductive detector.

FIG. 28 shows an arrangement to deliver power to a detector through the wall of a pressure vessel [38]. Pressure vessel applications require containment of high pressures—and hence thick vessel walls—but a small distance between the transformer windings [41 & 42] for good electrical coupling. This disparity in requirement is resolved by the use of a blind tube [39] as an integral part or connected to of the vessel wall [38]. It should be noted that the invention may be run in reverse to output data. Alternatively, another parallel electrical arrangement may be arranged around the same mechanical parts to provide a route for power input and signal output. A first winding [42] receives power from a host system from wires [43]. The winding [42] is arranged inside a blind tube [39] which is secured to vessel's wall [38]. The tube [39] is preferably made from an electrical insulator such as glass, polycarbonate or plastic. A tube or pipe is used because even a thin walled tube is mechanically strong under high pressure. This first winding [42] couples energy to a second winding [41] arranged around the outer diameter of the tube [39]. If the tube [39] must be produced from a non-insulating material (for reasons of durability or stability perhaps under hostile conditions) then preferably a relatively low conductivity material such as non-magnetic stainless steel should be used. In such an instance, the maximum material or tube [39] wall thickness should be less than the skin depth for the membrane material at the electrical transmission frequency. Non-magnetic stainless steel is a good example of a relatively low conductivity material and it has a skin depth in the order of a few mm at transmission frequencies in the kHz range. Furthermore, it is extremely robust and chemically inert in all but the most aggressive environments.

The power and signals to and from the detector are not necessarily for the sole use of the detectors described within this patent.

Fourth Embodiment

In a fourth embodiment the invention provides a high performance, low cost electronic circuit for the control of an inductive detector. This is of particular relevance for high resolution position measurements.

Figure 13:
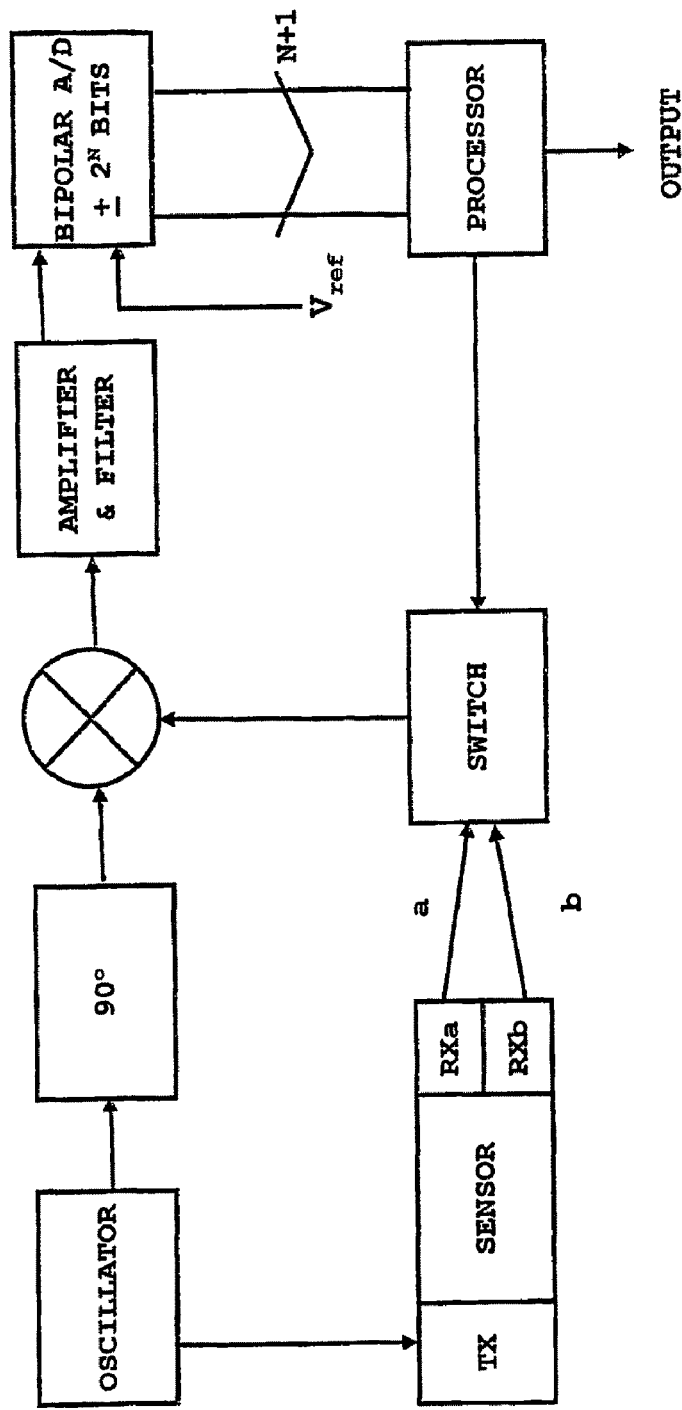
FIG. 13 shows a schematic of a known form of position encoder with limited measurement resolution.

FIG. 13 schematically shows a known arrangement of an inductive detector. The electrical schematic is self explanatory. The known system works but its performance is limited by its measurement resolution. The mathematical computations of the various measurement characteristics are given by:

$$\text{Signal level } (s) = \sqrt{a^2 + b^2}$$

$$\text{Resolution} = N + \text{Log}_2\left(\frac{S}{V_{ref}} \times 2\Pi\right)$$

$$\text{Maximum Resolution} = N + 1 + \text{Log}_2(\Pi)$$

$$\text{Typical Resolution} = N - 1 + \text{Log}_2(\Pi)$$

$$\rightarrow N + \text{Log2}(\Pi)$$

$$\varphi = a\tan\left(\frac{\text{Int}\left(\frac{a}{V_{ref}} \times 2^N\right)}{\text{Int}\left(\frac{b}{V_{ref}} \times 2^N\right)}\right)$$

where φ is the angular equivalent of the displacement of an EID relative to an arrangement of transmit and receive windings of a pitch L or 2 Pi radian cycle.

Figure 14:
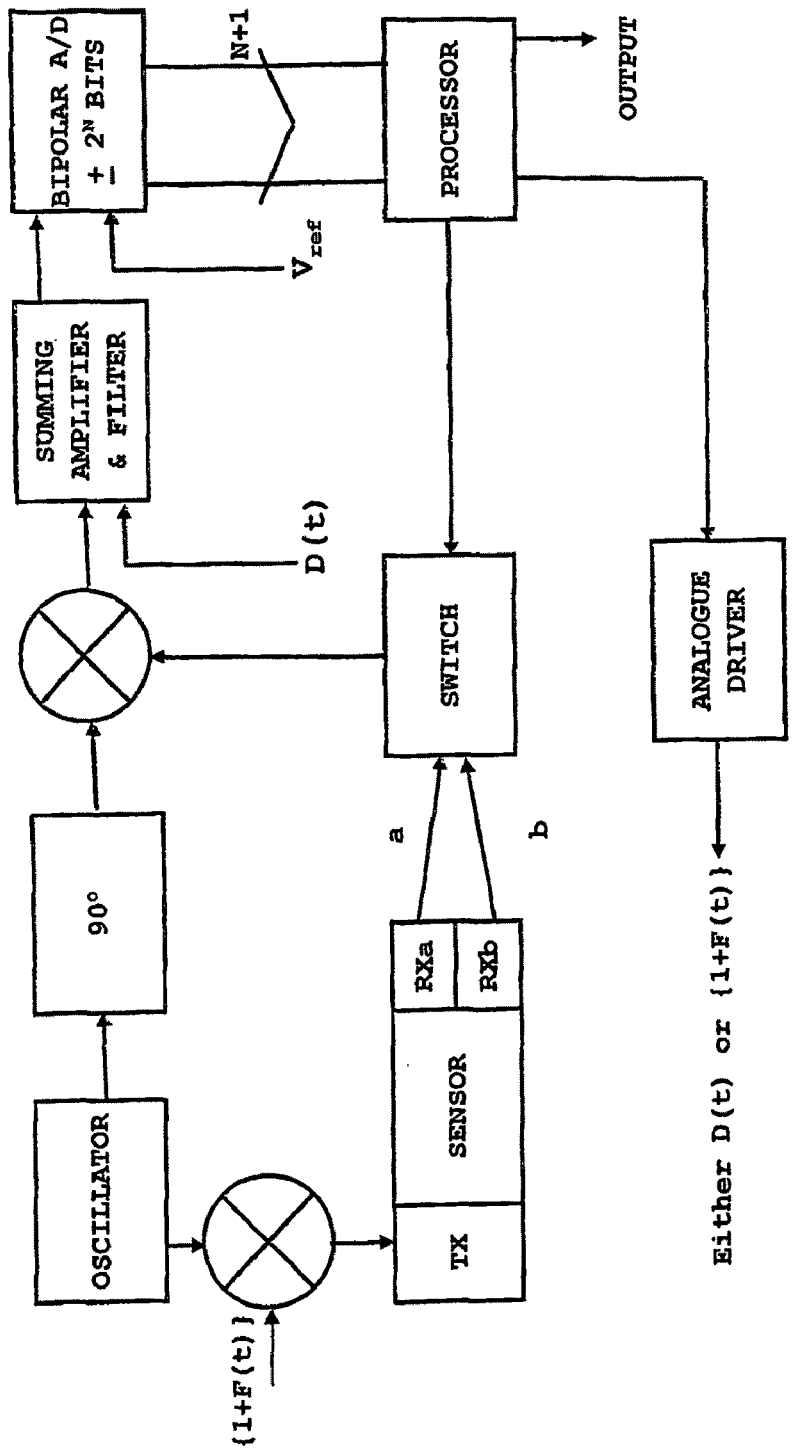
FIG. 14 shows a schematic of a known form of position encoder with high measurement resolution.
Figure 15:
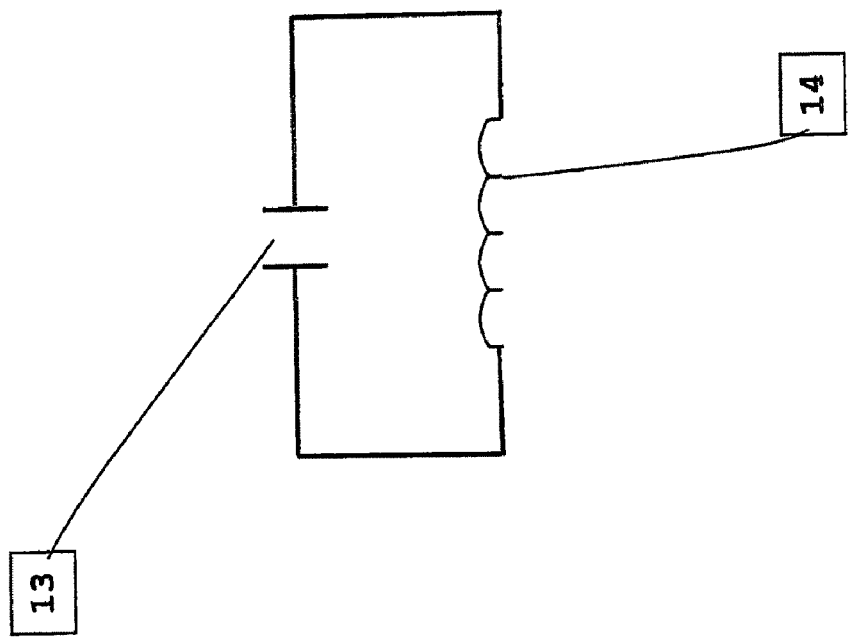
FIG. 15 shows a schematic of a resonant circuit.

The typical resolution tends to $N+\log_2(\text{Pi})$ due to the need for some signal headroom at the A/D converter input. This is prohibitively coarse for some applications and limits the use of small low cost A/D converters. FIG. 14 schematically shows a fourth embodiment of the invention as an inductive detector arrangement with increased measurement resolution. The electrical schematic is self explanatory. Two different methods are shown where either D(t) or {1+F(t)} are applied at two different locations. Considering an average of M cycles the position of the EID relative to the transmit and receive windings is given by the formula:

$$\varphi = a\tan\left(\frac{\sum_{i=0}^{M} \text{Int}\left(\frac{a_i}{V_{ref}} \times 2^N\right)}{\sum_{i=0}^{M} \text{Int}\left(\frac{b_i}{V_{ref}} \times 2^N\right)}\right)$$

The maximum resolution approximates to $N+1+\log_2(M \times \text{Pi})$ whereas the typical resolution depends on the exact form of the waveforms D(t) and F(t) (and the signal amplitude 'S' as before). The resolution increase approaches $\log_2(M)$ if D(t) or F(t) produce more than 1 bit of variation at the input to the analogue to digital converter and is linear in time over M samples. D(t) can be a simple fixed amplitude waveform whereas F(t) may be readily created using a digital pattern.

Modifications & Further Embodiments

Previously, the more usual form of inductive detector using a single transmit [1c] and two receive windings [1a & 1b] has been described for clarity. This need not necessarily be the case. As will be appreciated by those skilled in the art, inductive detector antennae such as those described herein, can effectively be used in reverse:—the transmit winding becomes the receive winding, received signals become transmitted signals etc. The pitch displacement of the receive windings [1a & 1b] described previously in first and second embodiments is not necessarily L/4. This was described for reasons of simplicity to make clear the use of arctan calculations on the two received signals.

Measurement resolution can be improved by the use of multiple pitch windings. If, for example, an electronics circuit produces measurement resolution of 10 bits over a full scale of L this can be improved by arranging the receive windings [1a & 1b] in to multiple pitches of <L. For example, if the windings [1a & 1b] are arranged in 5 pitches each of length L/5 then the measurement resolution will be equivalent to 10 bits over L/5, in other words a five fold improvement in resolution.

One draw back of multi-pitch arrangements is that the measured position is ambiguous rather than absolute. Absolute position measurement can be achieved by the use of a second, coarse pitch arrangement of receive windings [1a &

1b] extending over the full scale. In this way a fine pitch measurement can be produced by measurement over the first winding and a second coarse measurement over the second winding. The two measurements may be combined to produce a high resolution, absolute position measurement.

An alternative scheme to coarse and fine pitch winding arrangements is the use of a Vernier technique. This technique uses two or more multi-pitch receive windings [1a & 1b]. For example, a first pair of windings of pitch 60 mm is used with a second pair of windings of 70 mm. The ambiguous readings from each pair of windings can be combined to provide absolute measurement. Absolute measurement is preserved up to the lowest common multiple of the pitches—in this example, 420 mm.

A further alternative to enable high resolution measurement over extended scales can be achieved with the use of a reed or Hall switch for example. In such an instance a magnet is attached to the EID [6] which triggers the switch to signify that, for example, a second area of the antenna [1] is in operation.

The invention is not limited to the measurement of linear displacement. If the arrangement of the antenna [1] and EID [6] is bent around an axis it can be seen that the invention is readily suitable for the measurement of rotary position. Further the EID [6] and antenna [1] can be arranged for a wide variety of sensing geometries including curvi-linear, 2-dimensional, roll, pitch, yaw, cylindrical and position measurements over complex surfaces. 3-dimensional position measurement can be made using the amplitude of the EID's [6] as an indication of its distance from the plane of the antenna [1]. Alternatively, 3D position measurement may be provided by the use of multiple antenna [1] arranged at right angles to each other.

To a significant extent, variation in the position of the EID [6] relative to the antenna [1] in axes other than the main measurement axis does not affect the measured value. In particular, the stand off distance between EID [6] and antenna [1] in the z-axis can vary without altering the measured displacement. The range of acceptable variation in the z-axis can be extended by adjusting the amplification factors used in the electronics circuit according to the amplitude of the received signals. If the EID [6] to antenna [1] distance is large then the amplitude of received signals will be small and large amplifications should be applied. The converse applies if EID [6] to antenna [1] distance is small.

Figure 16:
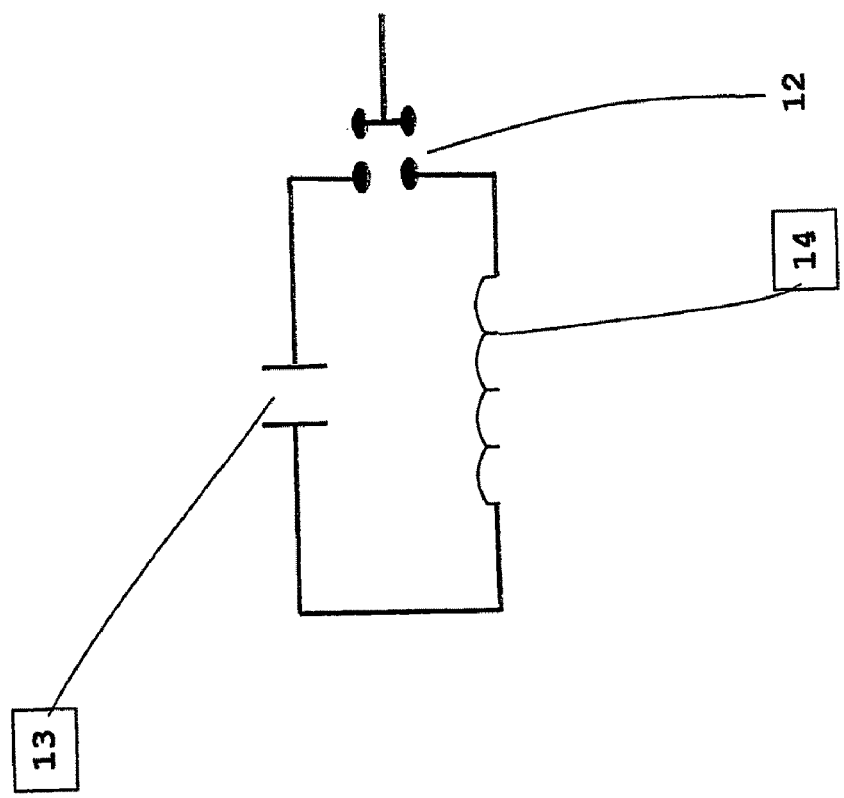
FIG. 16 shows a schematic of a resonant circuit with a normally open switch.

FIG. 16 shows a schematic of how the invention may be used as a non-contact method of transmitting switch status. A normally open switch [12] is arranged in series with a resonant EID's capacitor [13] and inductor [14]. When a local antenna [1] is energised, currents will be unable to flow in the EID [6] because of the open circuit and no signal will be received by the antenna [1]. When the switch [12] is closed currents will flow and the antenna [1] will receive a signal. The converse is also true when a normally closed switch is used. Data regarding multiple switches may be provided by using multiple resonant circuits of various resonant frequencies. Alternatively the switches can be used to switch in other capacitors [13] or inductors [14] so as to alter the natural frequency of the EID [6] and hence provide data on switch position.

Figure 17A:
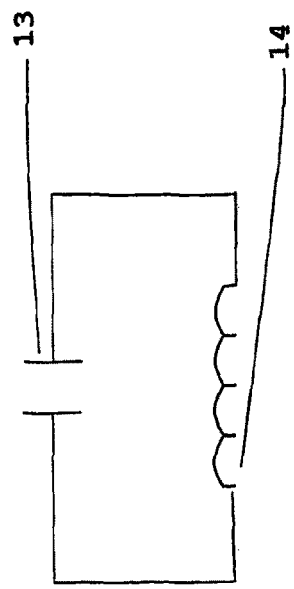
FIGS. 17a, 17b & 17c show schematic methods of encoding identities on to EIDs.
Figure 17B:
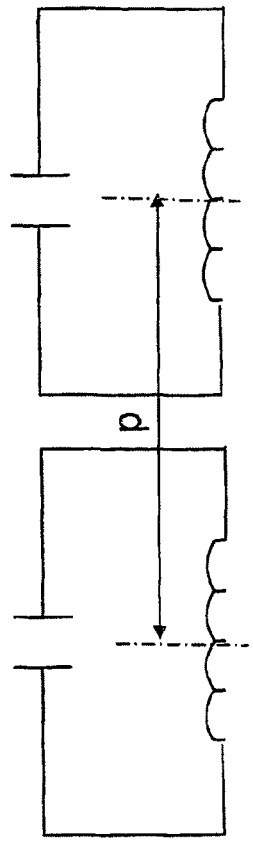
Figure 17C:
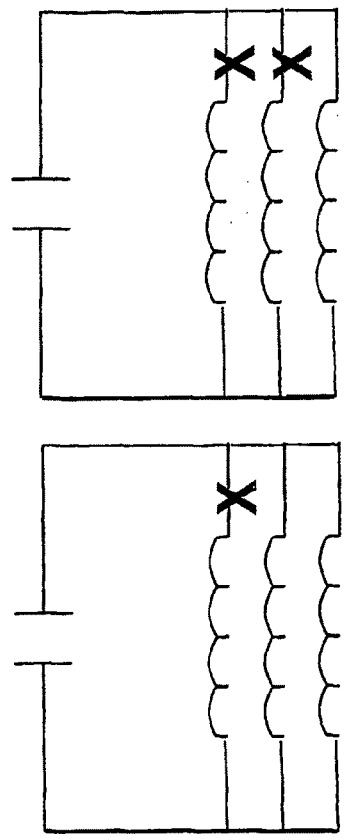

FIGS. 17a, 17b & 17c schematically show methods of how the invention may be used as an identification method.

In FIG. 17a, an inductor [14] and capacitor [13] are arranged in electrical series. Varying either the capacitor [13] or inductor [14] will vary the circuit's natural frequency. This technique can be used as a way of encoding identity against a predetermined set of identities and frequencies held in the electronic circuit's memory. Typically, a practical range of possible frequencies will be limited to about 10 so that tolerances on frequencies can be tolerated and frequency harmonics avoided.

In FIG. 17b, 2 resonant circuits are provided. In this way the combination of potential resonant frequencies increases the practical number of possible identities. Further, by varying the distance between the circuits, p, this increases the number of identities still further. Large numbers of identities can be encoded with the use of more than 2 EIDs [6] and 2-dimensional (in x & y-axes) sensing.

FIG. 17c shows a schematic of a resonant circuit with inductances in parallel. By obliterating part of one or more of the inductor's [14] at positions marked X then the circuit's inductance is altered and, in turn, the resonant frequency. This can be readily performed using a computer numerically controlled printed circuit board drilling machine and is an alternative method of varying a circuit's frequency compared to changing the value of the capacitor. In this way, resonant circuits can be produced in bulk from a small number of PCB's and capacitors and then tailored to specific identification requirements at point of delivery.

Figures 18A, 18B:
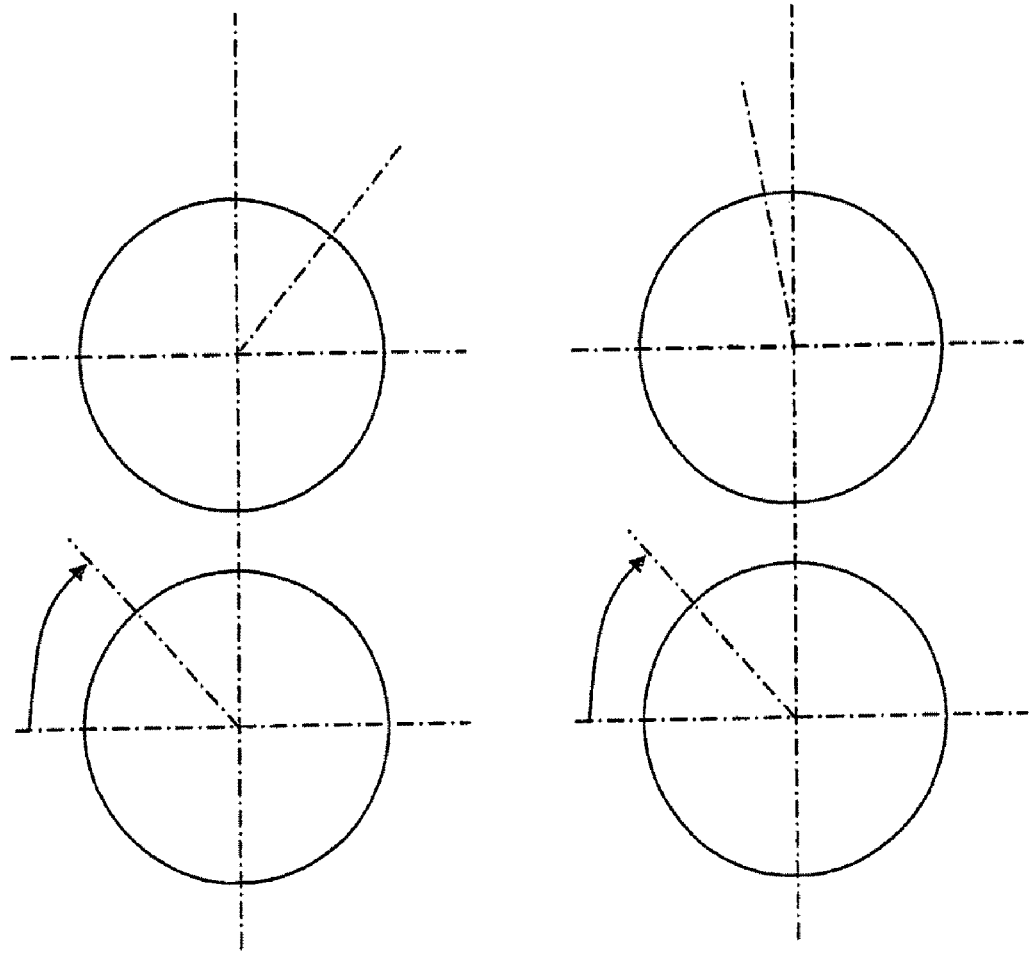
FIGS. 18a & 18b show schematics of encoding identities using the relative displacements of multiple EIDs.

FIG. 18a and 18b show a schematic arrangement of two resonant circuits which may be rotated around their respective centre point. The measured positions of the resonant circuits may be taken as a means of identification, rather like moving the dials of a padlock or safe. This is particularly useful for automatic, non-contact measurement of a manual action.

The invention can identify a multiplicity of EIDs [6] and measure their displacement relative to the antenna [1] in a roughly concurrent fashion. Individual resonant frequencies are most readily attained by careful selection of different capacitor [13] values for example to produce 3 EIDs [6] with resonant frequencies of 1, 2 and 4 MHz. The electronics circuit can be programmed to excite at these frequencies in turn and carry out measurements for each EID [6]. In order to maximise the frequency and accuracy of measurements more sophisticated excitation and measurement algorithms can be used. For example, the EID [6] which is found to be generally stationary is measured least and the one that has moved most recently or most often is measured most frequently.

A single electronics circuit may control multiple antennae [1] each co-operating with one or more EIDs [6]. The electronics circuit may use frequency or time based multiplexing and provide electrical outputs accordingly.

Figure 12:
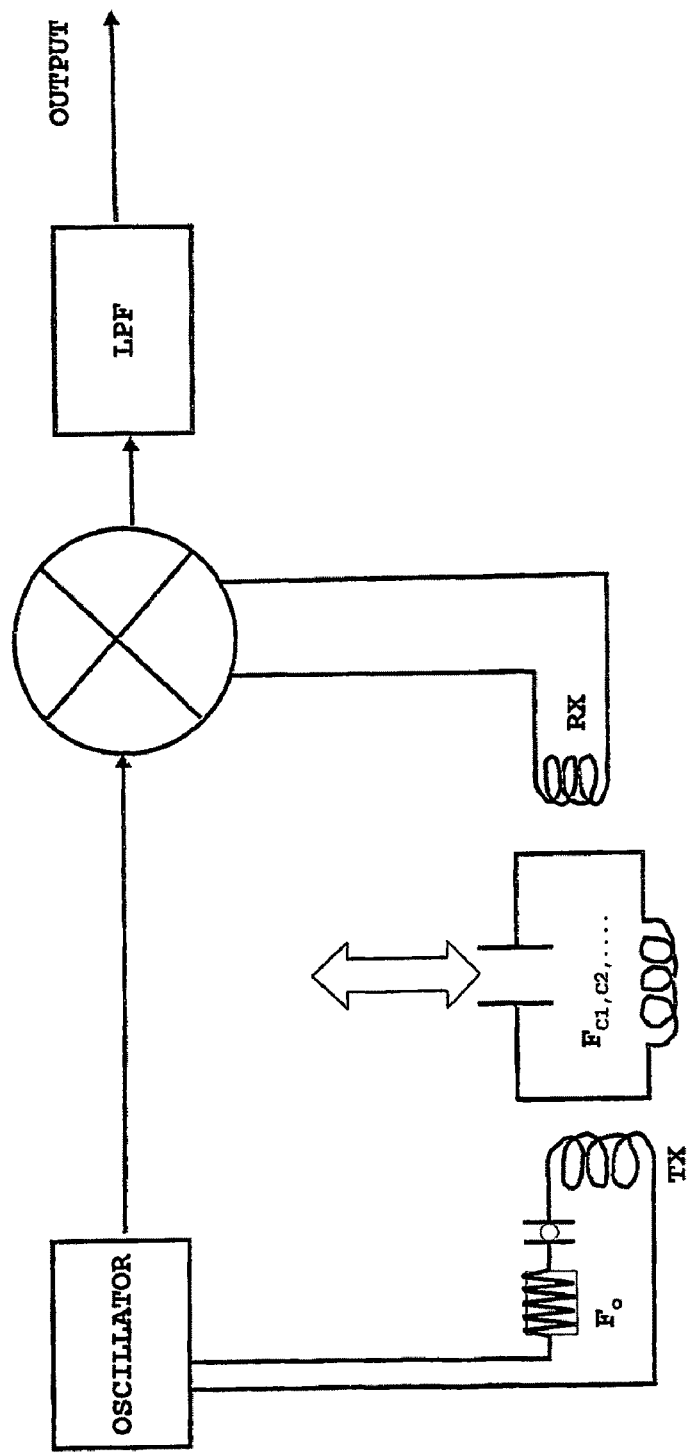
FIG. 12 shows a schematic of a known form of position encoder with a simplified electronics circuit.

In a further embodiment the invention provides an inductive detector which has particular relevance for applications that require low power consumption, such as battery powered devices. FIG. 1 schematically shows a known arrangement of an inductive detector. The electrical schematic is self explanatory. Only one set of transmit [1c] and receive windings [1b] is shown for simplicity. The known system works but its performance and costs are limited in a number of respects. Firstly, detectors of this type are relatively power hungry. Secondly, the cost of the electronics circuit is prohibitively expensive for some high volume, mass market applications. FIG. 12 schematically shows this further embodiment of the invention. The electrical schematic is self explanatory. Only one set of transmit [1c] and receive windings [1b] is shown for clarity. The transmit winding [1c] is constructed as a resonant circuit. Accordingly, the detector requires less power than known detector constructions to produce a given strength of magnetic (H) field. Further, the electronics circuit is simplified since the transmit winding [1c] produces a phase shift thereby removing the phase shift required in the electronic circuit's oscillator. Secondly, the detector's gain removes the need for electronic amplification at a given drive power. The transmit winding's [1c] resonant frequency ($f_o$) is preferably constructed at substantially the same resonant frequency ($f_c$) as the EID [6] and with a Q of 10 to 30. When multiple EIDs [6] of various resonant frequencies are to be measured then the transmit winding's [1c] resonant Q factor can be artificially reduced by adding a parallel resistance. Alternatively, the transmit resonance frequency ($F_o$) can be made tunable.

Figure 23:
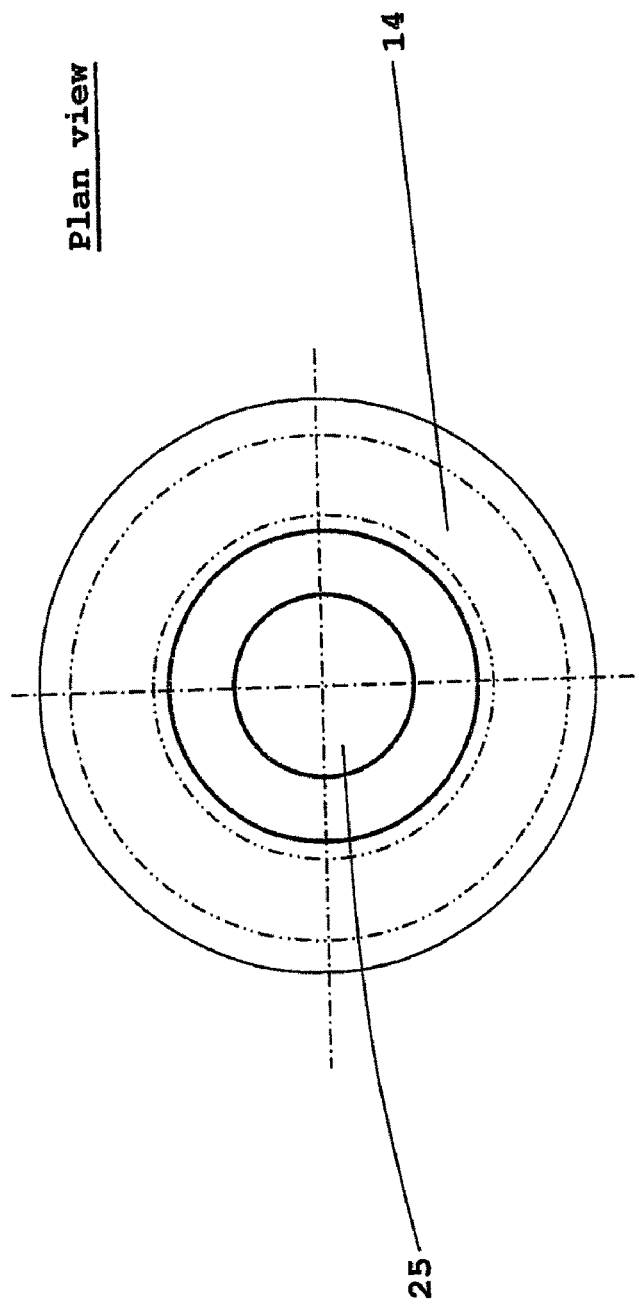
FIG. 23 shows an arrangement of an inductor and a core.
Figure 24:
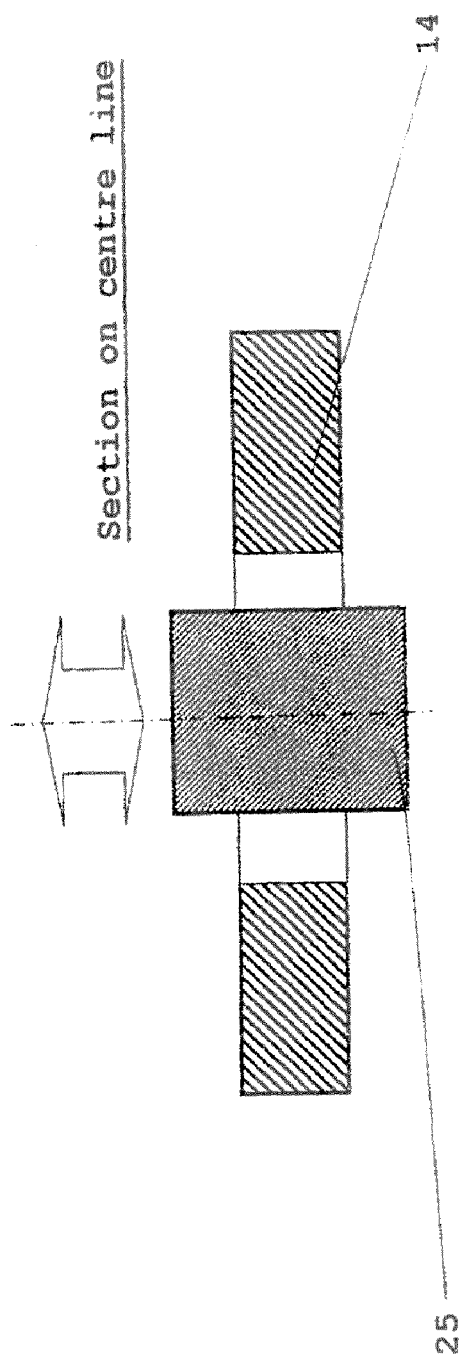
FIG. 24 shows a sectional arrangement of an inductor and a core.

In most instances (but not all) the invention's EID [6] is preferably made from a resonant circuit comprising an inductor [14] and capacitor [13] in series. The inductor [14] is preferably formed as a spiral wound inductor [14] on a PCB as shown in plan view in FIG. 23 and in section in FIG. 24. When a magnetically permeable element [25] displaces relative to the inductor [14] the inductance value alters. This may be detected by a local antenna [1] as a shift in the resonant frequency of the EID [6]. Such a movement may be produced, for example, by a change in pressure on a component to which the magnetically permeable element [25] is attached; the pressing of the magnetically permeable element [25] by a user or a change in temperature which causes an extension or retraction of the magnetically permeable element [25].

There is no absolute size limitation to the invention. The limits are only set by limits of manufacturing processes rather than physical laws. At one extreme, very large detectors can be produced by winding copper wire over pegs arranged at defined positions. At the other extreme, very small detectors can be produced using deposition of conductive tracks on a silicon wafer.

Figure 25:
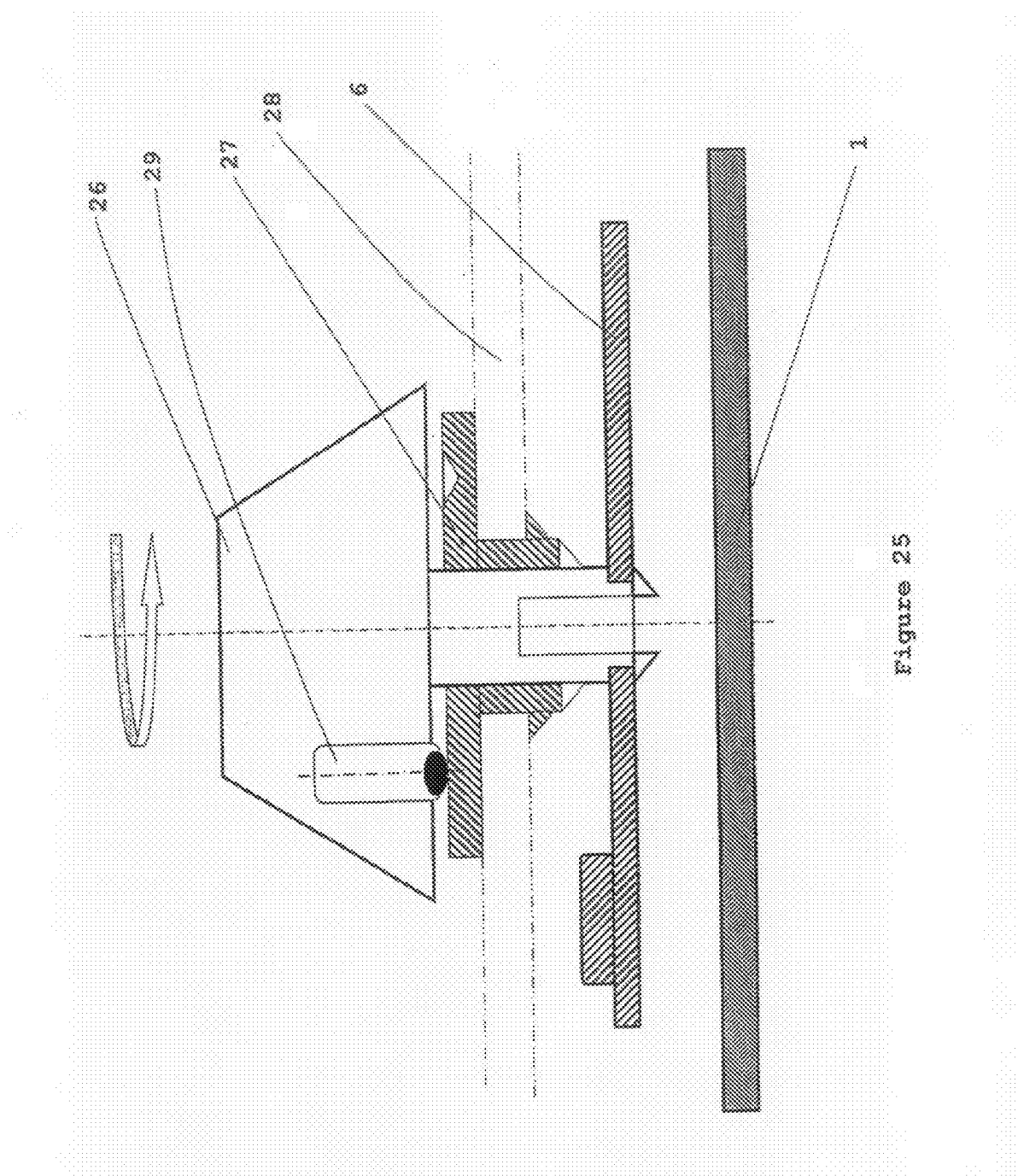
FIG. 25 shows an arrangement of a rotary user element, EID and an antenna used in the detection of a user's touch and movement.

In a further embodiment the invention may be constructed to detect touch from a person or object. FIG. 25 shows a sectional view on the centre line of a rotary user element. A conductive knob [26] has a clip feature which holds a EID [6]. The EID [6] comprises at least one resonant circuit. The knob [26] and EID [6] assembly is held in place relative to a fascia panel [28] by a plastic housing [27] clipped to the fascia panel. The plastic housing [27] contains recesses against which a mechanical detent [29] acts to provide the user with tactile feedback. The EID [6] rotates relative to a planar antenna [1]. The antenna [1] is secured relative to the fascia panel [28] but at a distance whereby the metal fascia is outside the antenna's [1] near field.

Figure 26:
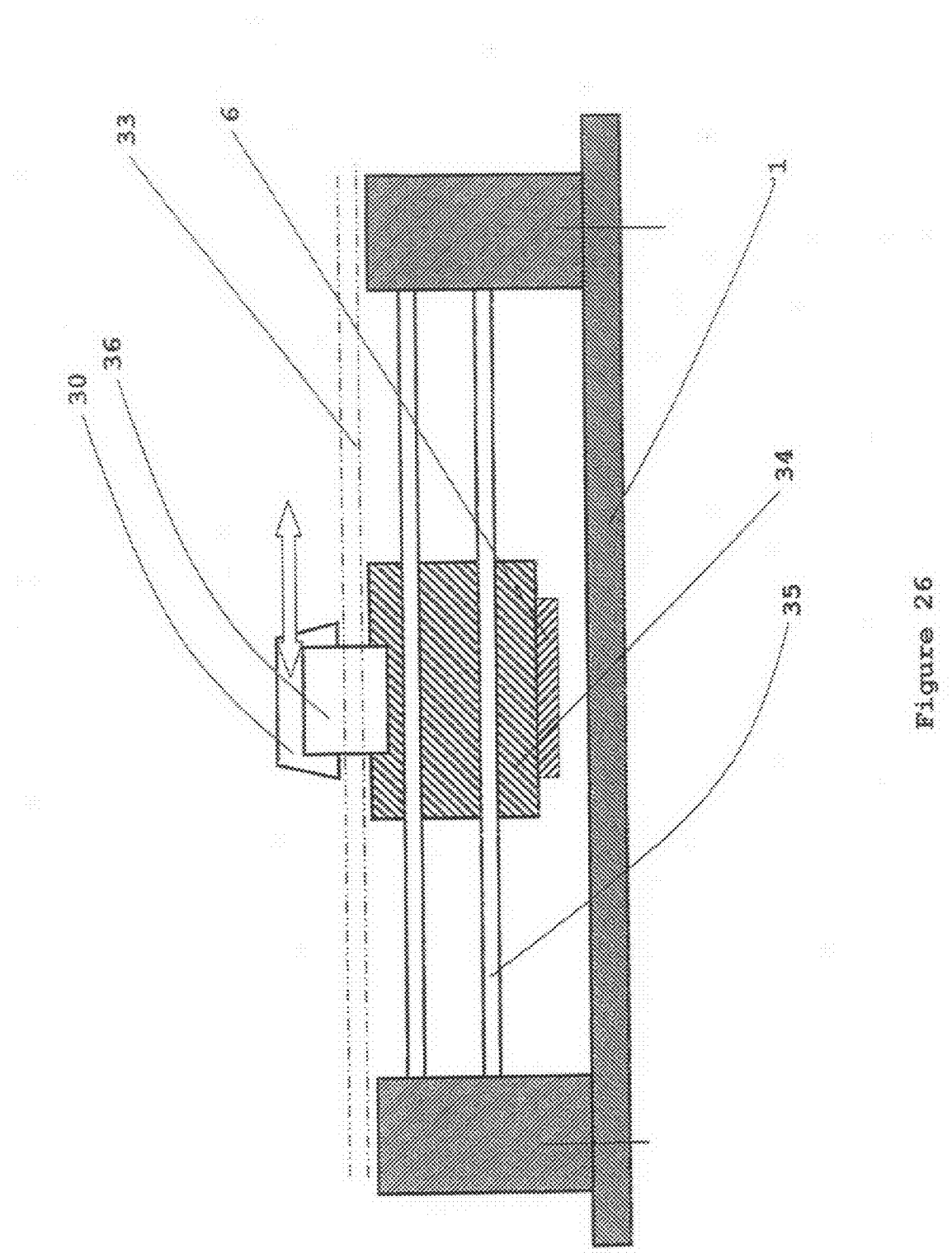
FIG. 26 shows an arrangement of a linear user element, EID and an antenna used in the detection of a user's touch and movement.

FIG. 26 shows a linear embodiment of the invention in which the conductive user element [30] is connected to a plastic moulding [34]. The moulding [34] is arranged such that it slides along 2 linear steel shafts [35]. The shafts [35] are fixed to the antenna [1]. The moulding [34] contains a conductive blade [36] on to which the user element [30] may be fixed. The tactile feel or friction of the moulding [34] running on the shafts [35] may be varied by the selection, presence or absence of a magnet [not shown for clarity] which is attracted to the shafts [35] and so alters the frictional force between the moulding [34] and shafts [35].

Figure 27:
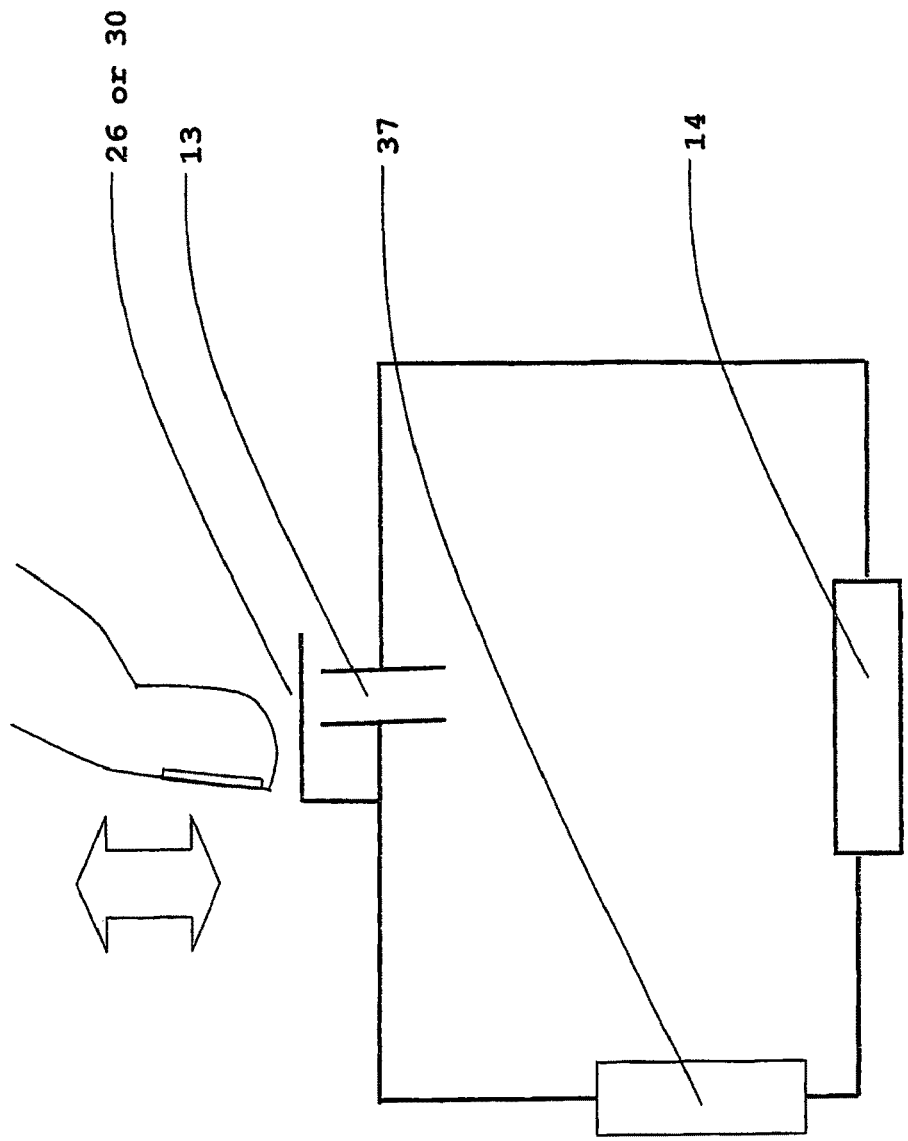
FIG. 27 shows an electrical schematic of a user element and EID used in the detection of a user's touch and movement.

Touch from a user may be detected with the aid of a modified resonant EID [6] connected to the user element [26 or 30]. This modified resonant EID [6] contains a larger second inductor [37] in series with the first inductor winding [14] as shown in FIG. 27. The resonant circuit and user element [26 or 30] are arranged such that when a user touches the user element [26 or 30] the user's finger effectively touches the capacitor [13] and produces a reduction in the EID's Q factor and shifts the circuit's resonant frequency. Such a change is readily detected by the antenna [1]. Preferably the place where the person touches is provided by a metallised surface of a plastic injection moulded user element [26 or 30]. The second inductor [37] preferably has a significantly larger inductance than the first inductor winding [14]. This enables the capacitor [13] to be smaller at a given resonant frequency and hence the circuit is more sensitive to touch.

Alternatively, touch may also be detected by using a separate second resonant EID [6] whose frequency is substantially different to the frequency of the first resonant circuit EID [6]. The first EID [6] is used for position measurement. The two EID's are arranged so that if a user touches the user element [26 or 30], only the Q of the second EID reduces. In this way there is no deleterious effect on the signal used to measure position. In both instances, either a change in the signal's Q or resonant frequency may be used as a method of contactlessly measuring a user's touch.

There are many applications for the invention including, but not limited to: actuators, aileron controls, angle sensors, radar antenna tracking, anti-counterfeit devices, audio controls, automatic teller machines, automation equipment, ball screws, boilers, brake sensors, brake wear sensors, burners, climate controls, cockpit controls, component identification, consumer electronics, cookers, cooking ranges, cooktops, dials, direction indicators, dishwashers, displacement sensors, door travel sensors, elevators, end of shaft encoders, fitness equipment, flow sensors, food mixers, fuel level sensors, fuel metering, games, gauges, giant magnetoresistive sensor replacements, guided vehicle tracking, gunnery sights, Hall affect replacements, headlamp level controls, HVAC sensors, hydraulic actuators, hydraulic valves, identification tags, impellers, inclinometers, Inductosyn replacements, industrial control panels, joysticks, kitchen goods, lifts, lighting controls, limit switch replacements, linear actuators, liquid level sensors, load sensors, LVDT replacements, machine tools, magnetostrictive sensor replacements, marine drives, marine controls, marine engines, mining equipment, missile guidance, motion controllers, motor encoders, odometers, packaging equipment, palletisers, paper thickness sensors, pedal sensors, pen sensing, petrochemical sensors, plotter controls, pneumatic actuators, pneumatic valves, pressure sensors, printer write heads, PRNDL sensors, proximity sensors, push buttons, radar controls, ride height sensors, robots, roll/pitch/yaw sensors, roller separation sensors, rotary encoders, RVDT replacements, safety switches, seating instrumentation, security tags, servo motors, shaft encoders, sheet feeders, skis, sliders, speed sensors, sports equipment, steering angle sensor, steering column controls, stepper motors, strain measurement, suspension dampers, suspension sensors, tachometers, tamper evident devices, throttle controls, tilt sensors, torque sensors, toys, traction control, transmission sensors, user interface elements, utility meters, valves, velocity sensors, vibration sensors, washing machines, weight sensors, wheel sensors, workpiece identification.

The invention claimed is:

1. An inductive detector operable to measure the relative displacement of two bodies along a measurement path comprising:
 a first body comprising an electrical intermediate device; and
 a second body comprising at least three windings; said windings being one of a transmit and a receive winding; at least one of said windings is a transmit winding and at least one of said windings is a receive winding; said winding being provided on a substrate having a first surface and a second surface opposite the first surface;
 wherein said windings are arranged such that relative displacement of the two bodies causes a change in the inductive coupling between said at least one transmit winding and said at least one receive winding, wherein at least two windings of said at least three windings are formed by a convoluted conductor with a first portion extending along the measurement path on the first surface of the substrate and a second portion returning back along the measurement path on the second surface of the substrate, said first and second portion being connected via a connection extending between the first surface and the second surface, wherein each convoluted conductor forms a series of loops defined between the portion of the conductor on the first surface and the portion of the conductor on the second surface, the width of each loop varying along the measurement path and adjacent loops having opposite electromagnetic polarity, and wherein said at least two windings are spaced in an axis normal to the measurement path.

2. An inductive detector according to claim 1, wherein the electrical intermediate device is inductively resonant.

3. An inductive detector according to claim 2, wherein a switch is placed in series with the electrical intermediate's devices capacitor and inductor and arranged so that the switch's status may be determined contactlessly.

4. An inductive detector according to claim 2, wherein the resonant frequency of the electrical intermediate device is measurably modified by displacement of a magnetically permeable element relative to the electrical intermediate device's inductor.

5. An inductive detector according to claim 1, wherein the loops are formed in a generally triangular shape.

6. An inductive detector according to claim 1, wherein the loops are interdigitated in the direction at right angles to the measurement path.

7. An inductive detector according to claim 1, wherein a transformer couples energy to at least one transmit winding and receives signals from at least one receive winding.

8. An inductive detector according to claim 7, wherein the angular twist between two points of a rotating elastic shaft is measured.

9. An inductive detector according to claim 7, wherein a substantially impermeable membrane is placed between the primary and secondary windings of the transformer.

10. An inductive detector according to claim 1 where the displacement along the measurement path of one winding series of loops to another of substantially the same pitch is ¼ of their winding pitch distance.

11. An inductive detector according to claim 1, wherein the antenna comprises multiple winding pitches along the measurement path.

12. An inductive detector according to claim 1, wherein the antenna comprises a winding whose single winding pitch extends over the measurement path and another winding which has multiple winding pitches over the measurement path.

13. An inductive detector according to claim 1, wherein the antenna comprises at least two pairs of windings of differing pitch arranged in a Vernier pattern.

14. An inductive detector according to claim 1, wherein the position of the electrical intermediate device measured relative to the windings is measured in a manner chosen from the list; absolutely; incrementally; ambiguously.

15. An inductive detector according to claim 1, wherein the windings and electrical intermediate device are arranged for relative displacement in a path chosen from one or more of the following list: linear; rotary; curvi-linear; roll; pitch yaw; 2-dimensional; 2-dimensional+rotary; 3-dimensional.

16. An inductive detector according to claim 1, wherein a multiplicity of resonant electrical intermediate devices each having its own resonant frequency cooperate with the transmit and receive windings.

17. An inductive detector according to claim 1, wherein the resonant frequency of the electrical intermediate device is used as a method of identification.

18. An inductive detector according to claim 1, wherein the resonant frequency of the electrical intermediate device and its position, is used as a method of identification.

19. An inductive detector according to claim 1, wherein the transmit windings are part of a resonant circuit.

20. An inductive detector according to claim 1, wherein the electrical intermediate device comprises a conductor which may be touched by another object.

21. An inductive detector according to claim 20, wherein the electrical intermediate device is arranged such that another object touching the conductor is detected by a reduction in the q-factor of the electrical intermediate device's signal.

22. An inductive detector according to claim 20, wherein the electrical intermediate device is arranged such that another object touching the conductor is detected by a shift in the frequency of the electrical intermediate device's signal.

23. An inductive detector operable to measure the relative displacement of two bodies along a measurement path comprising:
a first body comprising an electrical intermediate device;
a second body comprising at least three windings; said windings being one of a transmit and a receive winding; at least one of said windings is a transmit winding and at least one of said windings is a receive winding; said windings being provided on a substrate having a first surface and a second surface opposite the first surface;
wherein said windings are arranged such that relative displacement of the two bodies causes a change in the inductive coupling between said at least one transmit winding and said at least one receive winding;
wherein a first of said windings is formed by a first convoluted conductor which extends along the measurement path substantially on said first surface of said substrate and returns along the measurement path substantially on said first surface; and a second of said winding is formed by a second convoluted conductor which extends along the measurement path substantially on said second surface of said substrate,
wherein each convoluted conductor forms a series of loops, the width of each loop varying along the measurement path and adjacent loops having opposite electromagnetic polarity,
wherein said first and second windings are spaced apart along the measurement path, and
wherein a plurality of locations being one of a crossing and a via location are provided between adjacent loops of said first and second windings.

24. An inductive detector according to claim 23, wherein each series of loops has an enclosed area which is in proportion to its distance from the electrical intermediate device.

25. An inductive detector according to claim 23, wherein the width of both transmit and receive windings varies along the measurement path.

26. An inductive detector according to claim 23, wherein said first convoluted conductor comprises a portion extending on said second surface at said locations.

27. An inductive detector according to claim 23, wherein said second convoluted conductor comprises a portion extending on said first surface at said locations.

28. An inductive detector according to claim 23, wherein said plurality of locations are provided in the longitudinal axis of symmetry of said loops.

29. An inductive detector according to claim 23, wherein at least two of said windings are spaced apart in a direction at right angles to the measurement path.

30. An inductive detector according claim 23, wherein a first winding is located, in use, in closer proximity to the electrical intermediate device than the second winding; the width of the second winding being greater than the width of the first winding.

* * * * *